US012705957B2

(12) United States Patent
Yarlagadda et al.

(10) Patent No.: US 12,705,957 B2
(45) **Date of Patent: *Aug. 11, 2026**

(54) AUTOMATIC ITEM IDENTIFICATION DURING ASSISTED CHECKOUT BASED ON VISUAL FEATURES

(71) Applicant: RadiusAI, Inc., Tempe, AZ (US)

(72) Inventors: Abhinav Yarlagadda, Woodinville, WA (US); Enis Dengi, Tempe, AZ (US); Sai Krishna Bashetty, Bellevue, WA (US); Rahul Santhosh Kumar Varma, Tempe, AZ (US); Daniel King, Seattle, WA (US); Kamalesh Kalirathinam, Tempe, AZ (US); Sri Priyanka Madduluri, Arlington, VA (US); Sharan Raja, Cambridge, MA (US)

(73) Assignee: RadiusAI, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/173,651

(22) Filed: Apr. 8, 2025

(65) Prior Publication Data

US 2025/0239142 A1 Jul. 24, 2025

Related U.S. Application Data

(63) Continuation of application No. 18/906,813, filed on Oct. 4, 2024, now Pat. No. 12,272,217.

(Continued)

(51) Int. Cl.
*G07G 1/00* (2006.01)
*G06F 16/55* (2019.01)

(Continued)

(52) U.S. Cl.
CPC ........... *G07G 1/0045* (2013.01); *G06F 16/55* (2019.01); *G06Q 20/203* (2013.01);

(Continued)

(58) Field of Classification Search
CPC ...... G07G 1/0045; G06F 16/55; G06V 10/26; G06V 10/762; G06V 10/7715; G06V 10/82
See application file for complete search history.

(56) References Cited

U.S. PATENT DOCUMENTS 10,649,770 B2 5/2020 Johnson
10,755,479 B2 8/2020 Colbert (Continued)

FOREIGN PATENT DOCUMENTS

CN 115393661 A 11/2022

OTHER PUBLICATIONS

International Search Report; International Searching Authority; International Application No. PCT/US2024/049964; Dec. 26, 2024; 2 pages.

(Continued)

*Primary Examiner* — Tuyen K Vo
(74) *Attorney, Agent, or Firm* — Taft Stettinius & Hollister LLP

(57) ABSTRACT

Systems and methods include extracting item parameters from images of items positioned at a POS system. Item parameters associated with each item when mapped into a feature vector for each item are indicative as to an identification of the item. The feature vectors are analyzed to determine whether item parameters when combined and mapped into the feature vectors match a corresponding feature vector stored in a database. The database stores different combinations of item parameters as mapped into different stored feature vectors with different stored feature vectors associated with different items thereby identifying each item based on each different combination of item parameters as mapped into each stored feature vector associated with each item. Each item positioned at the POS (Continued)

system is identified when the feature vectors associated with each item match a corresponding stored feature vector as stored in the database.

22 Claims, 7 Drawing Sheets

Related U.S. Application Data

(60) Provisional application No. 63/587,874, filed on Oct. 4, 2023.

(51) Int. Cl.

| | |
|---|---|
| ***G06Q 20/20*** | (2012.01) |
| ***G06T 7/70*** | (2017.01) |
| ***G06V 10/12*** | (2022.01) |
| ***G06V 10/25*** | (2022.01) |
| ***G06V 10/26*** | (2022.01) |
| ***G06V 10/40*** | (2022.01) |
| ***G06V 10/74*** | (2022.01) |
| ***G06V 10/762*** | (2022.01) |
| ***G06V 10/764*** | (2022.01) |
| ***G06V 10/77*** | (2022.01) |
| ***G06V 10/82*** | (2022.01) |
| ***G06V 20/52*** | (2022.01) |

(52) U.S. Cl.

CPC ............. *G06Q 20/208* (2013.01); *G06T 7/70* (2017.01); *G06V 10/12* (2022.01); *G06V 10/25* (2022.01); *G06V 10/26* (2022.01); *G06V 10/40* (2022.01); *G06V 10/74* (2022.01); *G06V 10/762* (2022.01); *G06V 10/764* (2022.01); *G06V 10/7715* (2022.01); *G06V 10/82* (2022.01); *G06V 20/52* (2022.01); *G06T 2207/30232* (2013.01)

(56) References Cited

U.S. PATENT DOCUMENTS

| | | | | |
|---|---|---|---|---|
| 12,272,217 | B1 | 4/2025 | Yarlagadda et al. | |
| 2016/0109281 | A1 | 4/2016 | Herring et al. | |
| 2018/0217836 | A1* | 8/2018 | Johnson .................... | G06F 9/28 |
| 2019/0034897 | A1 | 1/2019 | Gao et al. | |
| 2019/0287301 | A1* | 9/2019 | Colbert .................. | G06N 3/084 |
| 2020/0193552 | A1 | 6/2020 | Turkelson | |
| 2020/0225673 | A1 | 7/2020 | Afrouzi et al. | |
| 2021/0004589 | A1 | 1/2021 | Turkelson | |
| 2021/0117948 | A1 | 4/2021 | Voss | |
| 2022/0207969 | A1 | 6/2022 | Howard et al. | |
| 2022/0414373 | A1 | 12/2022 | Krishnamurthy et al. | |
| 2022/0414398 | A1 | 12/2022 | Krishnamurthy et al. | |
| 2023/0005342 | A1 | 1/2023 | Brakob | |
| 2023/0110741 | A1* | 4/2023 | Cerovic .................... | G06T 7/70 382/103 |
| 2023/0206014 | A1 | 6/2023 | Howard et al. | |

OTHER PUBLICATIONS

Written Opinion of the International Searching Authority; International Searching Authority; International Patent Application No. PCT/US2024/049964; Dec. 26, 2024; 5 pages.

International Search Report; International Searching Authority; International Application No. PCT/US24/50030; Feb. 7, 2025; 4 pages.

Written Opinion of the International Searching Authority; International Searching Authority; International Patent Application No. PCT/US24/50030; Feb. 7, 2025; 10 pages.

International Preliminary Report on Patentability; The International Bureau of WIPO; International Application No. PCT/US2024/049964; Apr. 16, 2026; 7 pages.

International Preliminary Report on Patentability; The International Bureau of WIPO; International Application No. PCT/US2024/050030; Apr. 16, 2026; 12 pages.

* cited by examiner

700

Bipartite Matching

| POS Record 1 | | SA Record 1 |
|---|---|---|
| 1. UPC1 | | 1. UPC1 |
| 2. UPC2 | | 2. UPC2 |
| **3. UPC3** | ⟺ | **3. UI5** |

| POS Record 2 | | SA Record 2 |
|---|---|---|
| 1. UPC4 | | 1. UPC4 |
| 2. UPC5 | | 2. UPC5 |
| **3. UPC6** | ⟺ ? | **3. UI1** |
| **4. UPC7** | ⟺ ? | **4. UI2** |

| POS Record 3 | | SA Record 3 |
|---|---|---|
| 1. UPC10 | | 1. UPC10 |
| 2. UPC5 | | 2. UPC5 |
| **3. UPC6** | ⟺ ? | **3. UI3** |
| **4. UPC3** | ⟺ ? | **4. UI4** |

- Bold UPCs are not in SA set of knowns
- Unknown item (UI) has some clips with feature vectors
- UPCs are akin to track IDs
- UIs are akin to detections
- We want to match UIs to Bold UPCs
- Each UPC has multiple UIs associated with it (like a track having a string of detections)
- We define distance as the (cosine) distance between the feature vectors of two UIs.
- We solve for a matching that minimizes the distance over all matchings Implementation:

- Use cosine distance between VIT feature vectors
- Use Hungarian algorithm to solve the assignment problem.

FIG.2

AUTOMATIC ITEM IDENTIFICATION DURING ASSISTED CHECKOUT BASED ON VISUAL FEATURES

CROSS-REFERENCE TO RELATED APPLICATIONS

The present application is a Continuation of U.S. Non-Provisional patent application Ser. No. 18/906,813, filed on Oct. 4, 2024, which claims the benefit of U.S. Provisional Application No. 63/587,874, filed on Oct. 4, 2023, which are incorporated herein by reference in their entirety.

BACKGROUND

Retailers often incorporate self-checkout systems at the Point of Sale (POS) in order to decrease the wait time of customers to have their selected items scanned and purchased at the POS. Self-checkout systems also reduce the footprint required for the checkout systems as assisted checkout systems require less footprint than traditional checkout systems that are staffed with a cashier. Self-checkout systems also reduce the quantity of cashiers required to staff the self-checkout systems as one or two cashiers may be able to manage several self-checkout systems rather than having a cashier positioned at every checkout system.

Self-checkout systems require the customer to scan one selected item for purchase at a time once positioned at the POS for items which have a Universal Product Code (UPC) which is scanned by the customer at the POS thereby identifying the item based on the scanned UPC. Selected items for purchase that do not have a UPC require the customer to then navigate through the self-checkout system to type in the name of the item without a UPC and then select the item in that manner. Errors often happen in which an item was not properly scanned and/or properly identified causing the self-checkout system to pause and require intervention by the cashier. Conventionally, self-checkout systems require intense interaction by the customer to essentially execute the checkout of the items by themselves. Self-checkout systems also increase the wait time for customers to checkout due to the pausing of the self-checkout systems and requiring the intervention of the cashier before continuing with the checkout process.

BRIEF SUMMARY

Embodiments of the present disclosure relate to providing a point of sale (POS) system that automatically identifies items positioned at the POS for purchase based on images captured of the items by cameras positioned at the POS as well as cameras positioned throughout the retail location. A system may be implemented to automatically identify a plurality of items positioned at a POS system based on a plurality of item parameters associated with each item as provided by a plurality of images captured by a plurality of cameras positioned at the POS system. The system includes at least one processor and a memory coupled with the at least one processor. The memory includes instructions that when executed by the at least one processor cause the processor to extract the plurality of item parameters associated with each item positioned at the POS system from the plurality of images of each item captured by the plurality of cameras positioned at the POS system to map the plurality of item parameters into a corresponding feature vector for each item. The item parameters associated with each item when combined and mapped into the corresponding feature vector for each item are indicative as to an identification of each corresponding item thereby enabling the identification of each corresponding item. The processor is configured to analyze each feature vector associated with each item positioned at the POS system to determine whether the item parameters when combined and mapped into each feature vector associated with each item matches a corresponding stored feature vector stored in an item parameter database. The item parameter identification database stores different stored feature vectors with each different stored feature vector associated with a corresponding item thereby identifying each corresponding item based on each different combination of item parameters mapped to each corresponding stored feature vector associated with each corresponding item. The processor is configured to identify each corresponding item positioned at the POS system when each feature vector associated with each item matches a corresponding stored feature vector as stored in the item parameter identification database and fail to identify each corresponding item when each feature vector associated with each item fails to match a corresponding stored feature vector. The processor is configured to stream each feature vector associated with each item positioned at the POS system that fails to match a corresponding stored feature vector stored in the item parameter identification database thereby enabling the identification of each failed item when each feature vector of each failed item are subsequently identified when positioned at the POS system after the failed match.

In an embodiment, a method automatically identifies a plurality of items at a Point of Sale (POS) system based on a plurality of item parameters associated with each item as provided by a plurality of images captured by a plurality of cameras positioned at the POS system. The plurality of item parameters associated with each item positioned at the POS system is extracted from the plurality of images of each item captured by the plurality of cameras positioned at the POS system to map the plurality of item parameters into a corresponding feature vector for each item. The item parameters associated with each item when combined and mapped into the corresponding feature vector for each item are indicative as to an identification of each corresponding item thereby enabling the identification of each corresponding item. Each feature vector associated with each item positioned at the POS system is analyzed to determine whether the item parameters when combined and mapped into each feature vector associated with each item matches a corresponding stored feature vector in an item parameter identification database. The item parameter identification database stores different combinations of item parameters as mapped into different stored feature vectors with each different stored feature vector associated with a corresponding item thereby identifying each corresponding item based on each different combination of item parameters mapped to each corresponding stored feature vector associated with each corresponding item. Each corresponding item positioned at the POS system is identified when each feature vector associated with each item matches a corresponding stored feature vector as stored in the item parameter identification database and fails to identify each corresponding item when each feature vector associated with each item fails to match a corresponding stored feature vector. Each feature vector associated with each item positioned on the POS system that fails to match a corresponding feature vector stored in the item parameter identification database is streamed thereby enabling the identification of each failed item when each feature vector of each failed item is subsequently identified when positioned at the POS system after the failed match.

Further embodiments, features, and advantages, as well as the structure and operation of the various embodiments, are described in detail below with reference to the accompanying drawings.

BRIEF DESCRIPTION OF THE DRAWINGS

Embodiments are described with reference to the accompanying drawings. In the drawings, like reference numbers may indicate identical or functionally similar elements.

FIG. 2 depicts a bipartite matching configuration to automate the labeling of crops of the images that capture the unknown item to complement the human intervention to the labeling of crops thereby decreasing the quantity of iterations of crop labelling required to train;

DETAILED DESCRIPTION

Figure 1:
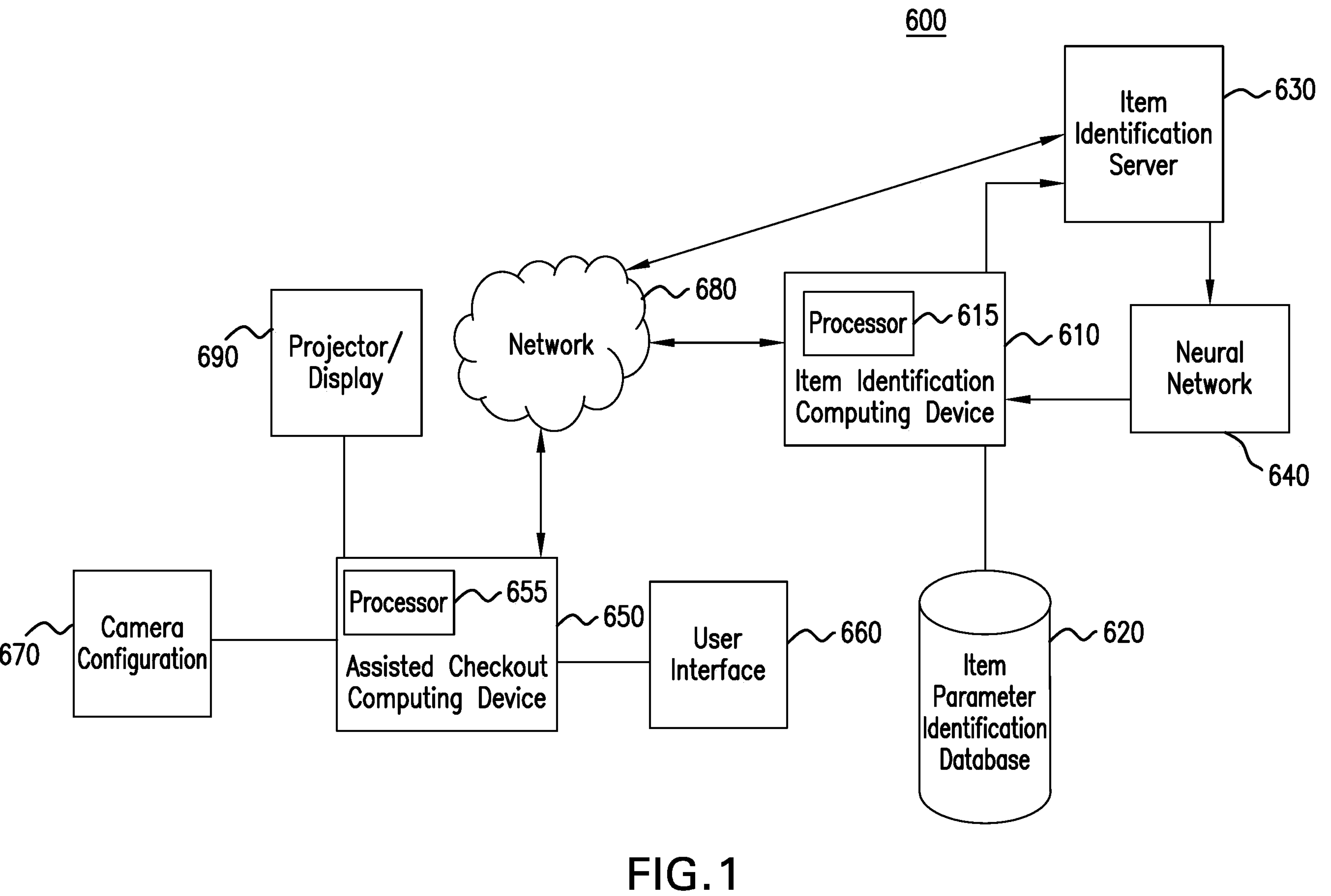
FIG. 1 depicts an illustration of an item identification configuration for identifying items positioned at a POS system based on feature vectors associated with the item.

Embodiments of the disclosure generally relate to providing a system for assisted checkout in which items positioned at the Point of Sale (POS) system are automatically identified thereby eliminating the need for the customer and/or cashier to scan and/or identify items that cannot be scanned manually. In an example embodiment, the customer approaches the POS system and positions the items which the customer requests to purchase at the POS system. Cameras positioned at the POS system capture images of each item and then an item identification computing device may then extract item parameters associated with each item from the images captured of each item by the cameras. The item parameters associated with each item are specific to each item and when combined may identify the item thereby enabling identification of each corresponding item. Item identification computing device may then automatically identify each item positioned at the POS system based on the item parameters associated with each item as extracted from the images captured of each item. In doing so, the customer simply has to position the items at the POS system and is not required to scan and/or identify items that cannot be scanned. The cashier simply needs to intervene when there is an issue when an item is not identified by item computing device.

However, in an embodiment, item identification computing device may continuously learn via a neural network in identifying each of the numerous items that may be positioned at the POS system for purchase by the customer. Each time that an item that is positioned at the POS system for purchase that item identification computing device does not identify, such item parameters associated with the unknown item may be automatically extracted from the images captured of the unknown by item identification computing device and provided to a neural network. The neural network may then continuously learn based on the item parameters of the unknown item thereby enabling item identification computing device to correctly identify the previous unknown item in subsequent transactions. The unknown item may be presented at numerous different locations in which item identification computing device automatically extracts the item parameters of the unknown item as presented at numerous different locations and provided to the neural network such that the neural network may continuously learn when the unknown item is presented at any retail location thereby significantly decreasing the duration of time required for item identification computing device to correctly identify the previously unknown item.

In the Detailed Description herein, references to "one embodiment", an "embodiment", and "example embodiment", etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in art to affect such feature, structure, or characteristic in connection with other embodiments whether or not explicitly described.

The following Detailed Description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the Detailed Description is not meant to limit the embodiments described below.

System Overview

As shown in FIG. 1, an item identification configuration 600 includes an item identification computing device 610, an assisted checkout computing device 650, a camera configuration 670, a user interface 660, a projector/display 690, an item identification server 630, a neural network 640, an item parameter identification database 620, and a network 680. Image identification computing device 610 includes a processor 615. Assisted checkout computing device 650 includes a processor 655.

The checkout process, during which items intended to be purchased by a customer are identified, and prices tallied, by an assigned cashier. The term Point of Sale (POS) is the area within a retail location at which the checkout process occurs. Conventionally, the checkout process presents the greatest temporal and spatial bottleneck to profitable retail activity. Customers spend time spent waiting for checkout to commence in a checkout line staffed by a cashier where the cashier executes the checkout process and/or in a line waiting to engage a self-checkout station and completing checkout where the cashier scans the items individually and/or the customer scans the items individually in a self-checkout station.

As a result, the checkout process reduces the turnover of customers completing journeys within the retail location in which the journey of the customer is initiated when the customer arrives at the retail location and continues as the customer proceeds through the retail location, and concludes when the customer leaves the retail location. The reduction in turnover in the customers completing journeys results in a reduction of sales by the retailer as customers are simply proceeding through the retail location less and thereby reducing the opportunity for the customers to purchase items. The conventional checkout process also impedes the flow of customer traffic within the retail location and also serves as a point of customer dissatisfaction in the shopping experience, as well as posing a draining and repetitive task for cashiers. Customers also appreciate and expect human interaction during checkout, and conventional self-checkout systems are themselves a point of aggravation in the customer experience.

Item identification configuration 600 may provide a defined checkout plane upon which items are placed at the POS system for recognition by item identification computing device 610. Assisted checkout computing device 650 may then automatically list items presented at the POS system for purchase by their customer and tally the prices of the items automatically identified by item identification computing device 610. In doing so, the human labor associated with scanning the items one-by-one and/or identifying the items one-by-one may be significantly reduced for the cashiers as well as the customers. Item identification configuration 600 may implement artificial intelligence to recognize the items placed on the checkout plane at the POS system at once, even when such items may be bunched together to occlude views of portions of some of the items, and of continually improving the recognition accuracy of item identification computing device 610 through machine learning.

A customer may enter a retail location of a retailer and browse the retail location for items in which the customer requests to purchase from the retailer. The retailer may be an entity that is selling items and/or services for purchase. The retail location may be a brick and mortar location and/or an on-site location that the customer may physically enter and/or exit the retail location when completing the journey of the customer in order to purchase the items and/or services located at the retail location. As noted above, the retail location also includes a POS system in which the customer may engage to ultimately purchase the items and/or services from the retail location. The customer may then approach the POS system to purchase the items in which the customer requests to purchase.

In doing so, the customer may present the items at the POS system in which the POS system includes a camera configuration 670. Camera configuration 670 may include a plurality of cameras positioned in proximity of the checkout plane such that each camera included in camera configuration 670 may capture different perspectives of the items positioned in the checkout plane by the customer. For example, the checkout plane may be a square shape and camera configuration 670 may then include four cameras in which each camera is positioned in one of the corresponding corners of the square-shaped checkout plane. In doing so, each of the four cameras may capture a different perspective of the square-shaped checkout plane thereby also capturing a different perspective of the items positioned on the checkout plane for purchase by the customer. In another example, camera configuration 670 may include an additional camera positioned above the checkout plane and/or an additional camera positioned below the checkout plane. Camera configuration 670 may include any quantity of cameras positioned in any type of configuration to capture different perspectives of the items positioned in the checkout plane for purchase that will be apparent to those skilled in the relevant art(s) without departing from the spirit and scope of the invention.

The POS system may also include assisted checkout computing device 650. Assisted checkout computing device 650 may be the computing device positioned at the POS system that enables the customer and/or cashier to engage the POS system. Assisted checkout computing device 650 may include user interface 660 such that user interface displays each of the items automatically identified as positioned at the POS system for purchase as well as the price of each automatically identified item as well as the total cost of the automatically identified item. Assisted checkout computing device 650 may also display via user interface any items that were not automatically identified and enable the cashier and/or customer to scan the unidentified item. Assisted checkout computing device 650 may be positioned at the corresponding POS system at the retail location.

One or more assisted checkout computing devices 650 may engage item identification computing device 610 as discussed in detail below in order to interface with of each of the customers and/or cashiers in real-time via user interface 660 with regard to their request for purchase of the item. Examples of assisted checkout computing device 650 may include a mobile telephone, a smartphone, a workstation, a portable computing device, other computing devices such as a laptop, or a desktop computer, cluster of computers, set-top box, and/or any other suitable electronic device that will be apparent to those skilled in the relevant art(s) without departing from the spirit and scope of the disclosure.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

Item identification computing device 610 may be a device that is identifying items provided to assisted checkout computing device 650 for purchase based on images captured by camera configuration 670. Examples of assisted checkout computing device 650 may include a mobile telephone, a smartphone, a workstation, a portable computing device, other computing devices such as a laptop, or a desktop computer, cluster of computers, set-top box, and/or any other suitable electronic device that will be apparent to those skilled in the relevant art(s) without departing from the spirit and scope of the disclosure.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

Item identification computing device 610 may be positioned at the retail location, may be positioned at each POS system, may be integrated with each assisted checkout computing device 650 at each POS system, may be positioned remote from the retail location and/or assisted checkout computing device 650 and/or any other combination and/or configuration to automatically identify each item positioned at the POS system and then the identification displayed by assisted checkout computing device 650 that will be apparent to those skilled in the relevant art(s) without departing from the spirit and scope of the invention.

Rather than have a cashier then proceed with scanning the items in which the customer requests to purchase and/or have the customer scan such items as positioned at the POS system, item identification computing device 610 may automatically identify the items in which the customer requests to purchase based on the images captured of the items by camera configuration 670. Assisted checkout computing device 650 may then automatically display the items in which the customer requests to purchase via user interface 660 based on the automatic identification of the items by item identification computing device 610. The customer may then verify that the displayed items are indeed the items that the customer requests to purchase and proceed with the purchase without intervention from the cashier.

As a result, the retailer may request that numerous items in which the retailer has for purchase in the numerous retail locations of the retailer be automatically identified by item identification computing device 610 as the customer presents any of the numerous items at the POS system to purchase. The retailer may have numerous items that differ significantly based on different item parameters. Each item includes a plurality of item parameters that when combined are indicative as to an identification of each corresponding item thereby enabling identification of each item by item identification computing device 610 based on the item parameters of each corresponding item. The item parameters associated with each item may be specific to the corresponding item in which each time the item is positioned at the POS system, the images captured of the corresponding item by camera configuration 670 depict similar item parameters thereby enabling item identification computing device 650 to identify the item each time the item is positioned at the POS system. The item parameters associated with each item may also be repetitive in which substantially similar items may continue to have the same item parameters such that the item parameters provide insight to item identification computing device 610 as to the item that has been selected for purchase by the customer. In doing so, the item parameters may be repetitively incorporated into substantially similar items such that the item parameters may continuously be associated with the substantially similar items thereby enabling the item to be identified based on the item parameters of the substantially similar items.

For example, a twelve ounce can of Coke includes item parameters specific to the twelve ounce can of Coke such as the shape of the twelve ounce can of Coke, the size of the twelve ounce can of Coke, the lettering on the twelve ounce can of Coke, the color of the twelve ounce can of Coke and so on. Such item parameters are specific to the twelve ounce can of Coke and differentiate the twelve ounce can of Coke from other twelve ounce cans of soda pop thereby enabling item identification computing device 610 to automatically identify the twelve ounce can of Coke based on such item parameters specific to the twelve ounce can of Coke. Additionally, each twelve once can of Coke as canned by Coca-Cola and distributed to the retail locations include substantially similar and/or the same item parameters as every other twelve ounce can of Coke canned by Coca-Cola and then distributed to the retail locations. In doing so, each time a twelve ounce can of Coke is positioned at any POS system at any retail location, item identification computing device 610 may automatically identify the twelve ounce can of Coke based on the repetitive item parameters specific to every twelve ounce can of Coke.

Item parameters may include but not limited to such as brand name and brand features of the item, ingredients of the item, weight of the item, metrology of the item such as height, width, length, and shape of the item, UPC of the item, SKU of the item, color of the item, and/or any other item parameter associated with the item that may identify the item that will be apparent to those skilled in the relevant art(s) without departing from the spirit and scope of the invention.

In doing so, each item in which the retailer requests to be automatically identified by and displayed by assisted checkout computing device 610 may be presented to item identification computing device 610 such that item identification computing device 610 may be trained to identify each item in offline training. The training of item identification computing device 610 in offline training occurs when the item is provided to item identification computing device 610 for training offline from when the item is presented to assisted checkout computing device 650 such that offline training occurs independent from actual purchase of the item as presented to assisted checkout computing device 650. Each item may be presented to item identification computing device 610 such that item identification computing device 610 may scan each item to incorporate the item parameters of each item as well as associate the item parameters with a UPC and/or SKU associated with the item. Item identification computing device 610 may then associate the item parameters of the item to the UPC and/or SKU of the item and store such item parameters that are specific to the item and correlate to the UPC and/or SKU of the item in the item parameter identification database 620. For purpose of simplicity, UPC may be used throughout the remaining specification but such reference may include but is not limited to UPCs, IANs, EANs, SKUs, and/or any other scan related identification protocol that will be apparent from those skilled in the relevant art(s) without departing from the spirit and scope of the present disclosure.

Each iteration that the item is scanned by item identification computing device 610, such item parameters of the item of each scan may further be stored in item parameter identification database 620. The item parameters captured for each iteration of scanning the item may then be provided to item identification server 630 and incorporated into neural network 640 such that neural network 640 may continue to learn as to the item parameters associated with the item for each iteration thereby increasing the accuracy of item identification computing device 610 correctly identifying the item. In doing so, assisted checkout computing device 650 also increases the accuracy in displaying to the customer via user interface 660 the correct identification of the item in which the customer presents to the POS system to request to purchase thereby streamlining the purchase process for the customer and the retailer.

However, such training of item identification computing device 610 occurs in offline training in which the retailer presents a list of the items that the retailer requests to be automatically identified in which the list includes the item and corresponding UPC. Each item on the list is then provided to item identification computing device 610 and each item is continuously scanned by identification computing device 610 in order for a sufficient quantity of iterations to be achieved until item identification computing device 610 may accurately identify the item. Such offline iterations is time consuming and costly as assisted checkout computing device 650 may fail in accurately displaying the identification of the item to the customer via user interface 660 in which the customer requests to purchase until item identification computing device 610 has obtained the sufficient of quantity of iterations to correctly identify the item via neural network 640.

Further, the retailer may continuously be adding new items to the numerous retail locations of the retailer in which such new items are available to purchase by the customer. Item identification computing device 610 may have not had the opportunity to be trained on the continuously added new items in offline training. Often times, the retailer has numerous retail locations and the retailer may not have control over their own supply chain. In doing so, the retailer may not know when items will be arriving each of the numerous retail locations as well as when the items will be ultimately purchased and discontinued at each of the numerous retail locations. As a result, item identification computing device 610 may not have the opportunity to execute offline learning of such numerous items at each of the numerous retail locations. In doing so, the new items may be continuously presented for purchase to assisted checkout computing device 650 but assisted checkout computing device 650 may fail to correctly display identification of the item to the customer via user interface 660 due to item identification computing device 610 not having the opportunity to receive the quantity of iterations in offline training to identify the new items.

However, each time that the customer presents an item to assisted checkout computing device 650 in which item identification computing device 610 may not have had sufficient iterations to train in offline manner to identify the item may actually be an iteration opportunity for item identification computing device 610 to train in identifying the item in online training. Item identification computing device 610 may train in identifying the item in online training when the customer presents the item to assisted checkout computing device 650 for purchase such that camera configuration 670 captures images of the item parameters associated with the item thereby enabling item identification computing device 610 to capture an iteration of training at the POS system of the item rather than doing so offline.

The retailer may experience numerous transactions in which the customer requests to purchase the item in which item identification computing device 610 has not had the opportunity to sufficiently train in offline training. Such numerous transactions provide the opportunity for item identification computing device 610 to train in online training to further streamline the training process in identifying the items. Further, the training of item identification computing device 610 with iterations provided by the customer requesting to purchase the item at the POS system further bolsters the accuracy in the identification of the item by item identification computing device 610 even after item identification computing device 610 has been sufficiently trained with iterations in offline training. Thus, the time in which to train item identification computing device 610 to accurately identify the item is decreased as well as the overhead to do so by adding the online training to supplement the offline training of item identification computing device 610.

As a result, the automatic identification of the items positioned at assisted checkout computing device 650 at the POS by item identification computing device 610 may enable the retailer to have the staff working at each retail location to execute tasks that have more value than simply scanning items. For example, the staff working at each retail location may then greet customers, stock shelves, perform office administration, and/or any other task that provides more value to the retailer as compared to simply scanning items. In doing so, the retailer may reduce the quantity of staff working at each retail location during each shift while also gaining move value from such staff working at each retail location during each shift due to the increase in value of the tasks that each staff member may now execute without having to scan items and/or manage a conventional self-checkout system that fails to automatically identify the items positioned at such conventional POS systems. The automatic identification of the items positioned at assisted checkout computing device 650 at the POS may also enable the retailer to execute a fully autonomous self-checkout system in addition to also reducing staff. Regardless, the automatic identification of the items positioned at assisted checkout computing device 650 at the POS provides the retailer with increased flexibility in staffing each retail location during each shift.

Item identification computing device 610 may be a device that is identifying items provided to assisted checkout computing device 650 for purchase based on images captured by camera configuration 670. One or more assisted checkout computing devices 650 may engage item identification computing device 610 in order to interface with of each of the customers and/or cashiers in real-time via user interface 660 with regard to their request for purchase of the item. User interface 660 may include any type of display device including but not limited to a touch screen display, a liquid crystal display (LCD) screen, a light emitting diode (LED) display and/or any other type of display device that includes a display that will be apparent from those skilled in the relevant art(s) without departing from the spirit and scope of the present disclosure.

Item Identification at the POS Based on Visual Features

Item identification computing device 610 may implement a Visual Transformer (VIT) classifier to identify items in which item identification computing device 610 has previously learned via offline learning and/or online learning. The VIT internally has feature vectors that embed visual features whereby the distance between two vectors is a proxy for the increased likelihood of the item being of that class as opposed to another. Each time that item identification computing device 610 encounters an item that has not yet been recognized by the classifier, item identification computing device 610 may obtain the identity of the item, such as the UPC of the item as discussed in detail below, in which images of the item that are cropped from the image of the scene may be stored for that item in item parameter identification database 620. Each time item identification computing device 610 encounters an unknown item, the classifier does not have that item in the list of classes. Item identification computing device 610 may then compare the crops of the item in the scene with crops saved in item parameter identification database 620 in which item identification computing device 610 performs an image search of item parameter identification database 620.

Item identification computing device 610 may extract the plurality of item parameters associated with each item positioned at the POS system from the plurality of images of each item captured by camera configuration 670 positioned at the POS system to map the plurality of item parameters into a corresponding feature vector for each item. Item parameters associated with each item when combined and mapped into the corresponding feature vector for each item are indicative as to an identification of each corresponding item thereby enabling the identification of each corresponding item. As discussed above, as item identification computing device 610 trains, item parameters for each item that are collected and then mapped into feature vectors and then stored in item parameter identification database 620 as associated with each item. For example, the feature vectors of the twelve ounce can of Coke are stored in item parameter identification database 620 and are associated with the twelve ounce can of Coke. Item identification computing device 610 may then extract the feature vectors of the twelve ounce can of Coke from the images captured of the twelve ounce can of Coke by camera configuration 670 when positioned at the POS system and determine whether such extracted feature vectors when match a combination of item parameters stored in item parameter identification database 620.

As discussed above, item identification computing device 610 may attempt to identify the item that is presented to assisted checkout computing device 650 for purchase by the customer based on item parameters associated with the item as captured by camera configuration 670. Item identification computing device 610 may attempt to identify the item based on item parameters that include visual features of the item. In doing so, item identification computing device 610 may attempt to identify a feature vector associated with the item in which the feature vector is a vector floating number representation of the image of the item as captured by camera configuration 670 in which the feature vector includes a depiction of the visual features of the item. The feature vector may be generated from the pixels of the image of the item captured by camera configuration 670 and then generates a matrix of data that is implemented into the feature vector such that the matrix of data of the feature vector depicts the visual features of the item as captured in the image of the item by camera configuration 670. The feature vector is then stored in item parameter identification database 620 for the item. For example, the item may be associated with a 1024 sized feature vector in which the 1024 sized feature vector when analyzed includes a depiction of the visual features of the item in which the feature vector is basically the biometric of the image of the item as captured by camera configuration 670. Thus, different items may have different feature vectors based on the different visual features between the different items as captured by the images of the different items by camera configuration 670.

Item identification computing device 610 may analyze each feature vector associated with each item positioned at the POS system to determine whether the item parameters when combined and mapped into each feature vector associated with each item matches a corresponding stored feature vector stored in item parameter identification database 620. Item parameter identification database 620 stores different combinations of item parameters as mapped into different stored feature vectors with each different stored feature vector associated with a corresponding item thereby identifying each corresponding item based on each different combination of item parameters mapped to each corresponding stored feature vector associated with each corresponding item.

For example, a twelve ounce can of Coke may have several different stored feature vectors that are stored in item parameter identification database 620 in which each of the different stored feature vectors include a different combination of item parameters of the twelve ounce can of Coke. The stored feature vectors have previously had the different item parameters associated with the twelve ounce can of Coke mapped to each corresponding stored feature vector such that each stored feature vector is associated with identifying the twelve ounce can of Coke as stored in item parameter identification database 620.

Item identification computing device 610 may identify each corresponding item positioned at the POS system when each feature vector associated with each item matches a corresponding stored feature vector as stored in item parameter identification database 620 and fail to identity each corresponding item when each feature vector associated with each item fails to match a corresponding stored feature vector. For example, item identification computing device 610 may automatically identify the twelve ounce can of Coke when the feature vectors extracted from the images captured of the twelve ounce can of Coke match the stored feature vectors stored in item parameter identification database 620 that are associated with the twelve ounce can of Coke. Thus, item identification computing device 610 thereby automatically identifies the twelve ounce can of Coke positioned at the POS system and assisted checkout computing device 650 displays the identification of the twelve ounce can of Coke to the customer.

However, item identification computing device 610 may fail to identify an item positioned at the POS system when item identification computing device 610 fails to match the feature vectors as extracted from the images captured of the item with stored feature vectors as stored in item parameter identification database 620. Item identification computing device 610 may fail to match the combination of item parameters associated with the item positioned at the POS system to a combination of item parameters stored in item parameter identification database 620 when item identification computing device 610 has yet to execute the quantity of iterations to adequately train to identify the item. As a result, the stored feature vectors of the unknown item have yet to be created and adequately associated with the unknown item in item parameter identification database 620 thereby resulting in the unknown item being unknown to item identification computing device 610.

The customer may present the item to assisted checkout computing device 650 in which item identification computing device 610 fails to identify the item as the item is a new item that is not included in the master list of items stored in item parameter identification database 620. Item identification computing device 610 may then instruct assisted checkout computing device 650 to display to the customer and/or cashier via user interface 660 that item identification computing device 610 fails to identify the item and to instruct the customer and/or cashier to scan the UPC of the item. The UPC of the item as well as the image of the item as captured by camera configuration 670 may be stored in item parameter identification database 620 and added to the master list of items stored in item parameter identification database 620. Further, item identification computing device 610 may also generate the feature vector for the item based on the image captured by camera configuration 670 and also store the feature vector of the item in item parameter identification database 620 as associated with the UPC of the item as well.

The next time the item is presented by the customer to assisted checkout computing device 650 for purchase, item identification computing device 610 may generate the feature vector of the item based on the image captured by camera configuration 670. Item identification computing device 610 may then query item parameter identification database 620 for items that have a feature vector associated with the item as stored in item parameter identification database 620 that matches the feature vector generated by item identification computing device 610 for the item that is currently presented to assisted checkout computing device 650 for purchase by the customer. Item identification computing device 610 may then identify the item that the customer requests to purchase based on the feature vector that matches the feature vector of an item stored in item parameter identification database 620.

Item identification computing device 610 may stream each feature vector associated with each item positioned at the POS system that fails to match a corresponding stored feature vector stored in item parameter identification database 620 thereby enabling the identification of each failed item when each feature vector of each failed item are subsequently identified when positioned at the POS system after each failed match. Item identification computing device 610 may stream the feature vectors associated with the unknown item such that item identification computing device 610 may then be trained to automatically identify the unknown item when the unknown item is subsequently positioned at the POS system.

Each time that the unknown item is positioned at the POS system and item identification computing device 610 then automatically streams the feature vectors of the unknown item results in an iteration of training for item identification computing device 610. After a series of iterations in which the unknown item is positioned at the POS system and such feature vectors are streamed by item identification computing device 610 for training, such feature vectors are then stored in item parameter identification database 620 as stored feature vectors and associated with the unknown item. As a result, each time the unknown item is subsequently positioned at the POS system, item identification computing device 610 may match the feature vectors to the stored feature vectors associated with the item in item identification computing device 610 thereby enabling item identification computing device 610 to identify the previously unknown item.

Item identification computing device 610 may automatically extract each feature vector associated with each item positioned at the POS system from the images captured of each item that failed to be identified at the POS system. Each feature vector includes POS data that depicts the item parameters captured at the POS system and identified as failing to match a corresponding combination of item parameters mapped to a corresponding stored feature vector stored in item parameter identification database 620. Item identification computing device 610 may automatically stream the POS data of each feature vector and each corresponding image captured of each item positioned at the POS system that failed to match a corresponding stored feature vector stored in item parameter identification database 620 to an item identification server 630.

For example, the twelve ounce can of Coke may be positioned at the POS system by the customer for purchase and item identification computing device 610 may automatically identify the twelve ounce can of Coke based on the feature vectors associated with the twelve ounce can of Coke as discussed above. However, a twelve ounce can of holiday Coke may be positioned at the POS system. The retailer may have not had the opportunity to conduct offline training of item identification computing device 610 with regard to automatically identifying the twelve ounce can of holiday Coke as the retailer may have had no notification as to when the twelve ounce cans of holiday Cokes were scheduled to arrive at the retail location and be stocked on the shelves of the retail location. The twelve ounce can of holiday Coke differs in color and design from the standard twelve ounce can of holiday Coke. Thus, in such an example, item identification computing device 610 automatically extracts the feature vectors associated with the twelve ounce can of holiday Coke from the images captured of the twelve ounce can of holiday Coke as POS data and streams such POS data to item identification server 630 as failing to match stored feature vectors stored in item parameter identification database 620.

Item identification computing device 610 may automatically receive an updated feature vector that includes updated streamed POS data associated with each image captured of each item that failed to be identified as trained on a neural network based on machine learning as the neural network continuously updates the updated feature vector with updated POS data based on past feature vectors that include past POS data as captured from past images captured of each item previously positioned at the POS system that failed to be identified as streamed from item identification server 620. As discussed above, item identification computing device 610 may automatically stream the POS data that identifies the feature vectors associated with the unknown item as extracted from the images of the unknown item to item identification server 630 each time item identification computing device 610 encounters the unknown item when positioned at the POS system. Item identification server 630 may then incorporate a neural network 640 such that the POS data of the unknown item may be trained on by neural network 640 based on machine learning. Each time the POS data of the unknown item is streamed by item identification computing device 610 to item identification server 640, such streamed POS data is updated by neural network 640 based on the past POS data trained on by neural network 640 of past instances of when item identification computing device 610 encountered the unknown item when positioned at the POS system.

For example, each time that the twelve ounce can of holiday Coke is positioned at the POS system and item identification computing device 610 fails to identify the twelve ounce can of holiday Coke, the feature vectors of the twelve ounce can of holiday Coke including the color and design may be streamed to item identification server 630 such that neural network 640 may train such POS data based on machine learning to be associated with the twelve ounce can of holiday Coke. Neural network 640 incorporates the POS data of each time that item identification computing device 610 fails to identify the twelve ounce can of holiday Coke with the past POS data of each previous time that item identification computing device 610 failed to identify the twelve ounce can of holiday Coke.

Item identification computing device 610 may analyze each updated feature vector as provided by neural network 640 to determine a plurality of updated item parameters associated with each item currently positioned at the POS system that failed to be identified when previously positioned at the POS system. Each updated feature vector associated with each item are indicative to an identity of each item currently positioned at the POS system when previously positioned at the POS system failed to match a corresponding stored feature vector as stored in item parameter identification database 620. Item identification computing device 610 may automatically identify each corresponding item currently positioned at the POS system when the updated feature vector associated with each item as provided by neural network 640 matches the corresponding stored feature vector associated with each item in item parameter identification database 620.

As discussed above, each time the POS data of the unknown item is streamed by item identification computing device 610 to item identification server 630, such streamed POS data is updated by neural network 640 based on past POS data trained on by neural network 640 of past instances when item identification computing device 610 encountered the unknown item. After a sufficient quantity of iterations in which item identification computing device 610 encountered the unknown item positioned at the POS system and streamed the POS data of the unknown item to neural network 640 such that the POS data of each iteration of the unknown item is trained on by neural network 640, neural network 640 provides the updated streamed POS data that is sufficiently trained such that item identification computing device 610 may then automatically identify the previously unknown item. In doing so, the updated feature vector which is updated with the updated streamed POS data to include the updated item parameters as provided by neural network 640 to item identification computing device 610 enables item identification computing device 610 to match the updated feature vectors to feature vectors associated with the previously unknown item in item parameter identification database 620 thereby enabling item identification computing device 610 to identify the previously unknown item.

For example, after a sufficient quantity of iterations in which the twelve ounce can of holiday Coke is positioned at the POS system and item identification computing devices 610 fails to identify the twelve ounce can of holiday Coke, the feature vectors of the twelve ounce can of Coke including the color and design may be sufficiently trained on by neural network 640 to generate updated feature vectors that includes the color and design of the twelve ounce can of holiday Coke. In doing so, neural network 640 may then provide the updated feature vectors of the color and design of the twelve ounce can of holiday Coke to item identification computing device 610 such that item identification computing device 610 may identify the color and design of the twelve ounce can of holiday Coke as being the twelve ounce can of holiday Coke despite the twelve ounce can of holiday Coke having different color and design from a standard twelve ounce can of Coke.

Item identification computing device 610 may continuously stream POS data as included in feature vectors to item identification server 630 such that item identification server 610 may accumulate POS data included in the feature vectors as stored in item parameter identification database 610. In doing so, item identification server 630 may continuously accumulate POS data as included in the feature vectors that are associated with the capturing of images of each item as streamed by item identification computing device 610 each time an item is positioned at a corresponding POS system. The POS data included in the feature vectors is accumulated from the pixels of each image and analyzed to recognize different item parameters as included in the feature vectors that are depicted by each image. Over time as the POS data as included in the feature vectors is accumulated by item identification server 630 continues to increase, neural network 640 may then apply a neural network algorithm such as but not limited to a multilayer perceptron (MLP), a restricted Boltzmann Machine (RBM), a convolution neural network (CNN), and/or any other neural network algorithm that will be apparent to those skilled in the relevant art(s) without departing from the spirit and scope of the disclosure.

Each time that POS data as included in the feature vectors is streamed to item identification server 630, neural network 640 may then assist image identification computing device 610 by providing item identification computing device 610 with the appropriate recognition of the item depicted by the image to automatically adjust the recognition of the item by item identification computing device 610 to correctly recognize the item depicted by the image. Neural network 640 may assist item identification computing device 610 in learning as to the appropriate item depicted by the image based on the POS data included in the feature vectors such that neural network 640 may further improve the accuracy of item identification computing device 610 in automatically recognizing the appropriate item depicted by the image to further enhance the analysis of the image. Neural network 640 may provide item identification computing device 610 with improved accuracy in automatically recognizing the appropriate item depicted in the image such that neural network 640 may continue to learn upon with the accumulation of POS data included in the feature vectors that is provided by item identification computing device 610 and/or any computing device associated with item identification configuration 600 to item identification server 620. Thus, recognition of images depicted by images by item identification computing device 610 may further enhance the identification of previously unknown items as positioned at any POS system at any retail location.

Item identification computing device 610 may crop each item positioned at the POS system from the plurality of images of each item captured by camera configuration 670 positioned at the POS system to segment each item positioned at the POS system into a single cropped image and excludes each other item positioned at the POS system from the single cropped image. Each image positioned at the POS system is depicted in a corresponding single cropped image that excludes each other item positioned at the POS system from the corresponding single cropped image.

The customer may present several different items at the POS system for purchase. Camera configuration 670 may then capture several different images of the several different items at the POS system for purchase. Rather than have each of the several different images captured by camera configuration 670 include several different items in each of the images, item identification computing device 610 may crop each item positioned at the POS system such that each item is segmented into a single cropped image. In doing so, the single cropped image is limited to depicting a single item positioned at the POS system while excluding each of the other items positioned at the POS system. Item identification computing device 610 may crop each item at the POS system such that each item is included in a single cropped image while excluding each of the other items positioned at the POS system.

For example, the customer may present the twelve ounce can of Coke, a bag of chips, and pack of gum to the POS system for purchase. Item identification computing device 610 may crop the twelve ounce can of Coke into a single cropped image that depicts the twelve ounce can of Coke while excluding the bag of chips and the pack of gum. Item identification computing device 610 may crop the bag of chips into a single cropped image that depicts the bag of chips while excluding the twelve ounce can of Coke and the pack of gum. Item identification computing device 610 may crop the pack of gum into a single cropped image that depicts the pack of gum while excluding the twelve ounce can of Coke and the bag of chips.

The customer may present several different items to assisted checkout computing device 650 for purchase in which camera configuration 670 captures the image of the several different items positioned at assisted checkout computing device 650 for purchase. Item identification computing device 610 may then crop the image captured by camera configuration 670 such that item identification computing device 610 segments the image such that each crop of the image includes a different item from the several different items positioned at assisted checkout computing device 650 for purchase.

Item identification computing device 610 may extract the plurality of item parameters associated with each item positioned at the POS system from each corresponding single cropped image depicting each corresponding item to map the plurality of item parameters into the corresponding feature vector for each item generated from each corresponding single cropped image. Item identification computing device 610 may analyze each feature vector generated from each corresponding cropped image to determine when the feature vector matches the corresponding stored feature vector stored in item parameter identification database 620. Item identification computing device 610 may identify each corresponding item positioned at the POS system when each feature vector generated from each corresponding cropped image matches the corresponding stored feature vector as stored in item parameter identification database 620.

For example, the customer presents five different items positioned at assisted checkout computing device 650 for purchase in which camera configuration 670 captures the image of the five different items positioned at assisted checkout computing device 650. Item identification computing device 610 may then crop the image such that the image is segmented into five different crops in which each crop includes each of the five different items positioned at assisted checkout computing device 650. Item identification computing device 610 may then extract the item parameters associated with each of the five different items from each of the corresponding cropped single images that depict each of the five different items individually while excluding each of the other items positioned at the POS system. Item identification computing device 610 may then map the item parameters extracted from each of the corresponding cropped single images of each of the five different items into feature vectors for each of the five different items as generated from each of the cropped single images depicting each of the five different items. Item identification computing device 610 then queries item parameter identification database 620 for stored feature vectors associated with items stored in item parameter identification database 620 that match each of the feature vectors generated from each of the cropped single images for each of the five different items as discussed above.

Item identification computing device 610 may incorporate offline training as well as the different approaches incorporated into online training discussed above based on the item parameters associated with the item that item identification computing device 610 fails to identify when the customer presents the unknown item to assisted checkout computing device 650. As discussed above, the iterations of training to identify the unknown item may be increased by incorporating the online training as well as the offline training discussed above based on the image parameters. In addition to the offline training as well as the online training discussed above based on the image parameters, the visual feature identification based on feature vectors discussed above may also be incorporated to complement the offline training and the online training to further increase the iterations of training to identify the unknown item by item identification computing device 610. The feature vector based matching may further enhance the classification of items in which the iterations required by item identification computing device 610 to identify the unknown item may be significantly reduced by implementing feature vector based matching.

As discussed above, item identification computing device 610 may be trained in which each time item identification computing device 610 fails to identify the item based on the crop of the image of the item as captured by camera configuration 670, item identification computing device 610 instructs assisted checkout computing device 650 to display to the customer and/or cashier via user interface 660 that item identification computing device 610 fails to identify the item. Assisted checkout computing device 650 then displays to the customer and/or cashier via user interface 660 to label the crop of the image in which the unknown item is captured with the UPC of the unknown item. Thus, the training of item identification computing device 610 in this approach requires human intervention and also requires a significant quantity of crops of the image that captures the unknown item to undergo this human intervention to train item identification computing device 610 to recognize the unknown item based on the crops of the image captured of the unknown item.

Item identification computing device 610 may stream each single cropped image depicting each corresponding item and each corresponding feature vector generated from the corresponding single cropped image for each item positioned at the POS system that fails to match a corresponding stored feature vector stored in item parameter identification database 620 to item parameter identification database 620. Item identification computing device 610 may accumulate a plurality of single cropped images captured of each corresponding item and a plurality of stored feature vectors generated from each corresponding single cropped image captured of each corresponding item into item parameter identification database 620 thereby enabling the plurality of single cropped images and corresponding stored feature vectors to be associated with each corresponding item as stored in item parameter identification database 620. Each single cropped image and each corresponding stored feature vector as associated with each corresponding item as stored in item parameter identification database 620 provides an increase in the item parameters associated with the corresponding item as stored in item parameter identification database 620.

Item identification computing device 610 may analyze the accumulation of the single cropped images and corresponding stored feature vectors as associated with each corresponding item in item parameter identification database 620 to determine whether a feature vector associated with an item as captured in a single cropped image as positioned at the POS system matches the accumulation of the single cropped images and corresponding stored feature vectors as associated with each corresponding item in item parameter identification database 620. Item identification computing device 610 may identify the item as captured in the single cropped image as positioned at the POS system when the feature vector associated with the item matches the accumulation of single cropped images and corresponding stored feature vectors for a corresponding item as stored in item parameter identification database 620. The accumulation of single cropped images and corresponding stored feature vectors as associated with the item positioned at the POS system provides the increase in the item parameters associated with the item as stored in item parameter identification database 620.

Each time that item identification computing device 610 fails to match feature vectors generated from the single cropped images of an item to stored feature vectors in item parameter identification database 620 to identify the item, item identification computing device 610 may stream the single cropped images and corresponding feature vectors of the failed identification of the item to item parameter identification database 620. The single cropped images and corresponding feature vectors of the failed identification of the item may continue to accumulate as stored in item parameter identification database 620. In doing so, the single cropped images and corresponding feature vectors may continue to accumulate until the single cropped images and corresponding feature vectors eventually match stored feature vectors associated with an item stored in item parameter identification database 620. As a result, the previously failed identification of the item that continued to be unidentified becomes identified by the accumulation of single cropped images and corresponding feature vectors after each failed identification of the item at the POS system.

Item identification computing device 610 may cluster the accumulation of the single cropped images and corresponding stored feature vectors that include an overlapping item parameter that overlaps into each of the stored feature vectors. The overlapping item parameter is associated with an item that is captured in each of the accumulations of the single cropped images thereby triggering the overlapping item parameter to be included in each of the stored feature vectors generated from the accumulation of the single cropped images.

Item identification computing device 610 may identify single cropped images and corresponding stored feature vectors as stored in item parameter identification database 620 as including shared item parameters in which each of the single cropped images and corresponding stored feature vectors share similar item parameters. As a result, the shared item parameters overlap in each of the single cropped images and corresponding stored feature vectors. Item identification computing device 610 may then cluster the single cropped images and corresponding stored feature vectors as stored in item parameter identification database 620 that have the shared image parameters that thereby overlap in each of the single cropped images and corresponding stored features as clustered by item identification computing device 610.

For example, different single cropped images and corresponding stored feature vectors may include the color and size of the twelve ounce can of Coke such that the color and size of the twelve ounce can of Coke overlap in each of the single cropped images and corresponding stored feature vectors that capture the color and size of the twelve ounce can of Coke. Item identification computing device 610 may then cluster each of the different single cropped images and corresponding stored feature vectors that include the color and size of the twelve ounce can of Coke that overlaps into each of the different single cropped images and corresponding stored feature vectors that are clustered by item identification computing device 610.

Item identification computing device 610 may determine a cosine distance for each stored feature vector as clustered from the accumulation of single cropped images that include the overlapping item parameter. The cosine distance for each stored feature vector as clustered from the accumulation of single cropped images provides an indication as whether each stored feature vector as clustered is associated with an identified item. Item identification computing device 610 may map each stored feature vector as clustered from the accumulation of single cropped images to the identified item when the cosine distance for each stored feature vector as clustered within a cosine distance threshold thereby indicating that each stored feature vector as clustered within the cosine distance is associated with the identified item.

Item identification computing device 610 may automatically annotate each single cropped image from the accumulation of single cropped images as capturing the identified item when each corresponding stored feature as clustered within the cosine distance threshold thereby indicating that each corresponding single cropped image as capturing the identified item. Item identification computing device 610 may automatically annotate the cluster of the accumulation of the single cropped images and corresponding stored feature vectors that include the overlapping item parameter that overlaps each of the stored feature vectors with a single label that identifies the cluster of accumulation of the single cropped images as capturing the identified item when the stored feature vectors as clustered are within the cosine distance.

Item identification computing device 610 may determine each stored feature vector as clustered from the accumulation of single cropped images that include the overlapping item parameter is associated with an identified item as identified item in item parameter identification database 620 based on a cosine distance for each clustered stored feature vector. Item identification computing device 610 may determine the cosine distance of each clustered stored feature vector with stored feature vectors associated with identified items in item parameter identification database 620. Item identification computing device 610 may then determine whether the cosine distance of each clustered stored feature vector with a stored feature vector associated with an identified item in item parameter identification database 620 is within a cosine distance threshold.

The cosine distance of each clustered stored feature vector is within the cosine distance threshold of a stored feature vector associated with an identified item when the cosine distance of each clustered stored feature vector indicates that each clustered stored feature vector includes a sufficient quantity of item parameters that are also included in the stored feature vector of the identified item. As a result, the previously unidentified item associated with the clustered stored feature vectors may be identified as the identified item as stored in item parameter identification database 620 based on the cosine distance of the clustered stored feature vectors and the stored feature vector of the identified item in item parameter identification database 620. Item identification computing device 610 may then map the clustered stored feature vectors to the identified item thereby identifying the previously unknown item associated with the clustered stored feature vectors with the identified item in item parameter identification database 620. Item identification computing device 610 may then automatically annotate each single cropped image that depicted the previously unknown item as the identified item as stored in item parameter identification database 620. Item identification computing device 610 may also automatically annotate the cluster of single cropped images with a single label that identifies the cluster of single cropped images as capturing the identified item as stored in item parameter identification database 620.

For example, item identification computing device 610 may determine the cosine distance of the clustered stored feature vectors that include the color and size of the twelve ounce can of Coke with stored feature vectors stored in item parameter identification database 620. In doing so, item identification computing device 610 may determine the stored feature vectors stored in item parameter identification database 620 that have a cosine distance with the clustered stored feature vectors that is within the cosine distance threshold of having item parameters of similar color and size of the twelve ounce can of Coke.

Item identification computing device 610 may then determine that the previously unknown item associated with the clustered stored feature vectors is the twelve ounce can of Coke based on the cosine distance of the clustered stored feature vectors and the stored feature vector associated with the identified twelve ounce can of Coke as stored in item parameter identification database 620 as having sufficiently similar item parameters of color and size to be identified as the twelve ounce can of Coke. Item identification computing device 610 may then automatically annotate each single cropped image depicting the previously unknown item as depicting the twelve ounce can of Coke. Item identification computing device 610 may also automatically annotate the cluster of single cropped images with a single label as the twelve ounce can of Coke Item identification computing device 610 may implement bipartite matching to automate the labeling of crops of the images that capture the unknown item to complement the human intervention to the labeling of crops to decrease the quantity of iterations of crop labelling required to train item identification computing device 610 to identify the unknown item based on the crops of the images that capture the unknown item by camera configuration 670 each time the unknown item is presented to assisted checkout computing device 650 by the customer for purchase. FIG. 2 depicts bipartite matching configuration 700 that item identification computing device 610 may implement to automate the labeling of crops of the images that capture the unknown item to complement the human intervention to the labeling of crops thereby decreasing the quantity of iterations of crop labelling required to train item identification computing device 610.

The customer may present several items to assisted checkout computing device 650 for purchase in which item identification computing device 610 may identify all but one of the items. For example, the customer may present three items to assisted checkout computing device 650 for purchase in which item identification computing device 610 may identify two of the items but fail to identify the third item. In such an example, the cashier may easily identify the unknown item and label the crop of the image that captures the unknown item to identify the unknown item.

The customer may present several items to assisted checkout computing device 650 for purchase in which item identification computing device 610 may fail to identify more than one of the items. Item identification computing device 610 may then extract the feature vectors from the single cropped images that capture each of the unknown items and stream to item parameter identification database 620. However, the unknown items in a single transaction may have also appeared as unknown items in numerous different transactions at numerous different locations. Each time item identification computing device 610 failed to identify the unknown items, item identification computing device 610 extracts the feature vectors from the single cropped images of the unknown items and stream to item parameter identification database 620.

For example, the customer may present three items to assisted checkout computing device 640 for purchase in which item identification computing device 610 may fail to identity two of the three items in which there is more than one unknown item. In such an example, item identification computing device 610 may extract the feature vectors of from the single cropped images of the two unknown items and stream to item parameter identification database 620. The two unknown items may have also appeared as unknown items in numerous different transactions at numerous different locations in which item identification computing device 610 extracted the feature vectors from the single cropped images of each transaction involving the two unknown items and stream to item parameter identification database 620.

As a result, item parameter identification database 620 may have stored several single cropped images with corresponding stored feature vectors for each of the two unknown items. Item identification computing device 610 may then each time that item identification computing device 610 fails to identify the two unknown items, item identification computing device 610 may compare the feature vectors extracted from the single cropped images of the two unknown items to the stored feature vectors captured from each transaction that item identification computing device 610 and stored in item parameter identification database 620. As the feature vectors of the two unknown items accumulate, the likelihood of item identification computing device 610 associated the two unknown items with the correct UPC codes increases thereby increasing the likelihood that item identification computing device 610 identifies the previously two unknown items. Item identification computing device 610 may then associate the correct UPC codes with the previously unknown items and store in item parameter identification database 620 such that the unknown items may be identified in future transactions.

In such an example, there are two unknown items positioned at assisted checkout computing device 650 but the UPCs of the two unknown items are known. However, item identification computing device 610 needs to execute a one on one mapping in which the first crop of the image that captures the first unknown item matches to the first UPC and the second crop of the image that captures the second unknown item matches to the second UPC.

In order to execute the one on one mapping, item identification computing device 610 may execute the bipartite matching in which item identification computing device 610 may execute batch processing and take multiple frames of multiple transactions in which the unknown items and/or the UPCs of the unknown items are appearing from item parameters captured at the POS as presented by the customer to assisted checkout computing device 650 for purchase. Item identification computing device 650 may then coordinate and cluster the image crops as captured by the camera configuration 670 from the unknown items positioned at assisted checkout computing device 650 and may map the cluster of image crops to the unknown items. In doing so, item identification computing device 610 may automate the labelling process of the crops of images that capture the unknown items. Rather than item identification computing device 610 looking at a single set of image crops from a single image captured of the unknown items positioned at assisted checkout computing device 650 by camera configuration 670 at a time, image identification computing device 610 may look at a cluster of image crops where the UPC of the unknown item appeared and attempt to coordinate in a quantity of transactions that the unknown item appeared and take the cluster of images and automatically label the cluster of images.

As discussed above, item identification computing device 610 may execute the feature vector based matching in which the feature vector may be generated from the pixels of the image that captures the unknown item. Item identification computing device 610 may then generate the feature vector that depicts the visual features of the unknown item as provided by the image captured of the unknown item. Item identification computing device 610 may then query item parameter identification database 620 to compare the feature vector of the unknown item to feature vectors of items stored in item parameter identification database 620. Item identification computing device 610 may implement the cosine distance to determine which of the feature vectors of items stored in item parameter identification database 620 that is the best match to the feature vector of the unknown item.

Item identification computing device 610 may implement the Hungarian algorithm when item identification computing device 610 executes the automatic labelling of the cluster of crops of images in which batch processing is implemented. Item identification computing device 610 may attempt to identify numerous unknown items with numerous labels of numerous crops of images in which item identification computing device 610 may execute the one to one matching of crop of the image of the unknown item to label of the unknown item based on the UPC of the unknown item. In doing so, item identification computing device 610 may assign one cluster of crops of images to one single label. Item identification computing device 610 may then assign a group of clusters of crops and a group of labels and so on based on the cosine distance that is the closest cluster of crops from the group of clusters of crops to do the labelling.

Item identification computing device 610 may be a continuously learning system. Item identification computing device may attempt to add items that item identification computing device 610 does not currently know, such as items that are not in the current list of classes of item identification computing device 610. There may be two ways in which item identification computing device 610 may use this information. The first way is when there is enough data, such as crops of the item, the model is trained to include the new class. The second way is the search method outlined in the item search based visual features. Item identification computing device 610 may also collect data to improve the recognition of current classes by augmenting the data set of crops.

The first way that item identification computing device 610 collects ground truth is implementing UPC recognition as discussed above. When an unknown item is encountered and item identification computing device 610 may match the observed UPC to an item in the list of items stored in item parameter identification database 620, the crops associated with that item may be associated with that UPC code and saved to item parameter identification database 620. Similarly, the UPC recognition points to a classification that is different from the class that item identification computing device 610 predicted, crops of the item are saved to be used in training.

The second way that item identification computing device collects ground truth is via user interaction. Item identification computing device 610 is an interactive system. Item identification computing device reports unknown items and allows a user, such as the cashier and/or customer, to correct item identification computing device 610 when item identification computing device 610 misidentifies an item. In the case of an unknown item, item identification computing device 610 highlights the unknown item via augmented reality and/or by presenting an image of the scene on user interface 660 (POS screen or user tablet) and highlighting the unknown item. The user enters the UPC code by scanning the item with a hand scanner or manually entering product information, such as through a product search, pressing a present key on the POS, and/or entering a product identifier. In the case of an incorrect identification, the user may choose the item on the POS or table and enter the correct information via the methods discussed above. The crops of the item are associated with the product identifier and saved in item parameter identification database 620.

The third way that item identification computing device 610 collects ground truth is via POS record matching. In the case of non-interactive integration with a POS system, item identification computing device 610 may send its basket information to assisted checkout computing device 650. The user may make the necessary corrections and additions on assisted checkout computing device 650 and may finalize the transaction. The final transaction data may be transmitted to item identification computing device 610. In this case, there may be ambiguity in the correspondence between the POS record and item identification computing device 610 predictions. For instance, there may be two unknowns in the item identification computing device 610 list. It is not possible at that time to definitively determine which crops belong to which identifiers from the POS. For this case, item identification computing device 610 may employ the bipartite matching algorithm depicted in FIG. 2 that operates on data from multiple transactions.

As discussed above once crops are associated with a new item, the search method has a chance to match the product when it shows up to item identification computing device 610 again. It is however desirable to add the new class to the classifier, once sufficient crops are obtained. There are two (mutually non-exclusive) ways for retraining. Semi-supervised learning in which the crops are validated by a human before the crops are used to train the new class. Unsupervised training when the confidence level is very high so no human validation is required and item identification computing device 610 automatically adds the new class and the associated crops to the training. For unsupervised training, item identification computing device 610 may use the variance of the cluster feature of vectors that represent the crops for the item as a metric. If the variance is comparable to items of the same category, the confidence level is acceptable. Otherwise, item identification computing device 610 may fall back on semi-supervised learning.

Figure 3:
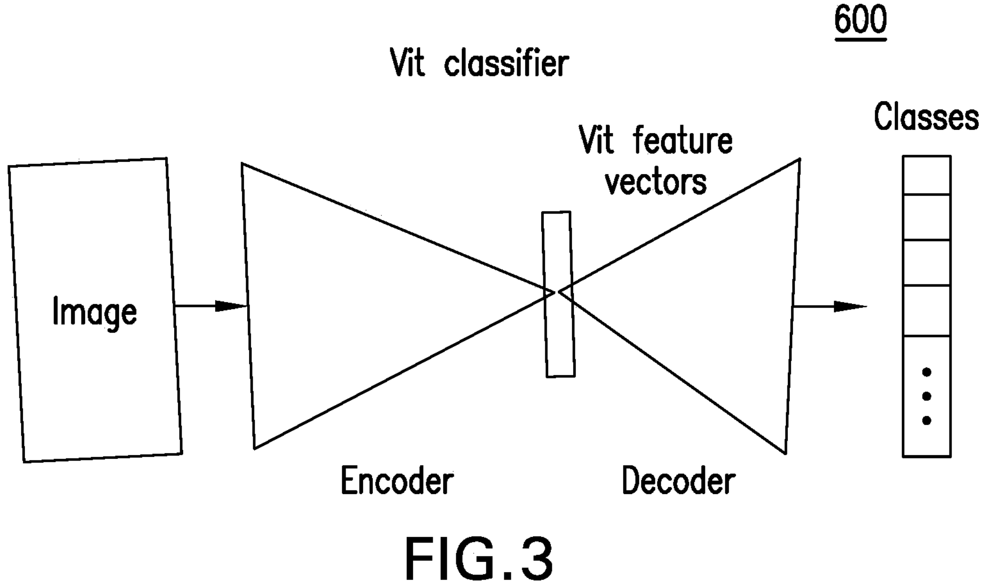
FIG. 3 depicts visual transformer classifier (ViT) configuration that may incorporate a visual transformer classifier (ViT) in different approaches.

FIG. 3 depicts visual transformer classifier (ViT) configuration 800 in which item identification computing device 610 may incorporate a visual transformer classifier (ViT) in different approaches. The first approach may incorporate ViT feature vectors from the existing classifier. The second approach may have the ViT feature vectors tuned further by implementing a triplet loss method to improve the performance of the search for the ViT feature vectors as stored in item parameter identification database 620. The ViT feature vectors may be optimized for search by independently training each ViT feature vector.

Conventional recognition algorithms include a conventional encoder and a conventional decoder in which the conventional encoder encodes an image and the conventional decoder decodes the image and then the conventional encoder encodes the text and the conventional decoder decodes the text. Conventional recognition algorithms fail to have the conventional encoder encode the image and the text simultaneously and have the conventional decoder decode the image and the text simultaneously. However, ViT classifier depicted in ViT configuration 800 may encode the visual features from the images of the item and the text features from the images of the item simultaneously as well as decode the visual features of the item and the text features of the item simultaneously. ViT classifier may generate a feature vector for the visual features of the item and a feature vector for the text features of the item in which the encoder may encode the feature vector for the visual features and the feature vector for the text features simultaneously to extract the visual features and the text features from the item and the decoder may decode the feature vector for the visual features from the item and the feature vector for the text features from the item simultaneously to classify the item.

For example, ViT classifier may generate feature vectors for the text features of the item that includes the salient features of the item, the description of the item, the text written on the package of the item, and/or any other textual feature that may be extracted from the image of the item and encoded into a feature vector that will be apparent to those skilled in the relevant art(s) without departing from the spirit and scope of the invention. ViT classifier may also generate feature vectors for the item features of the item that includes the colors of the item, the figures of the item, the text and shape of the item, the size of the item, and/or any other visual feature that may be extracted from the image of the item that will be apparent to those skilled in the relevant art(s) without departing from the spirit and scope of the invention. ViT classifier may then classify the item based on the feature vectors for the text features of the item and the feature vectors for the visual features of the item as encoded by the encoder simultaneously and then decoded by the decoder simultaneously to identify the class of the item.

Item identification computing device 610 may implement ViT classifier such that ViT classifier encodes the text feature vectors and the visual feature vectors extracted from the single cropped image simultaneously and then determines the cosine distance for each of the stored text feature vectors and the stored visual feature vectors. The simultaneous encoding of the VIT classifier of the text feature vectors and the visual feature vectors and decoding simultaneously decreases the duration of time required for item identification computing device 610 as well as increases the quantity of feature vectors for item identification computing device to compare the text feature vectors and the visual feature vectors of the item. Item identification computing device 610 is able to compare the partitioned out text feature vectors and visual feature vectors of the single cropped image to the stored text feature vectors and stored visual feature vectors stored in item parameter identification database 620. Item identification computing device 610 may then determine the cosine distance and cluster for each of the text feature vectors and the visual feature vectors as discussed above. The decoder of the ViT classifier may then decode to provide the class of the item.

In-store Connectivity of Example Assisted Checkout Devices

Figure 4:
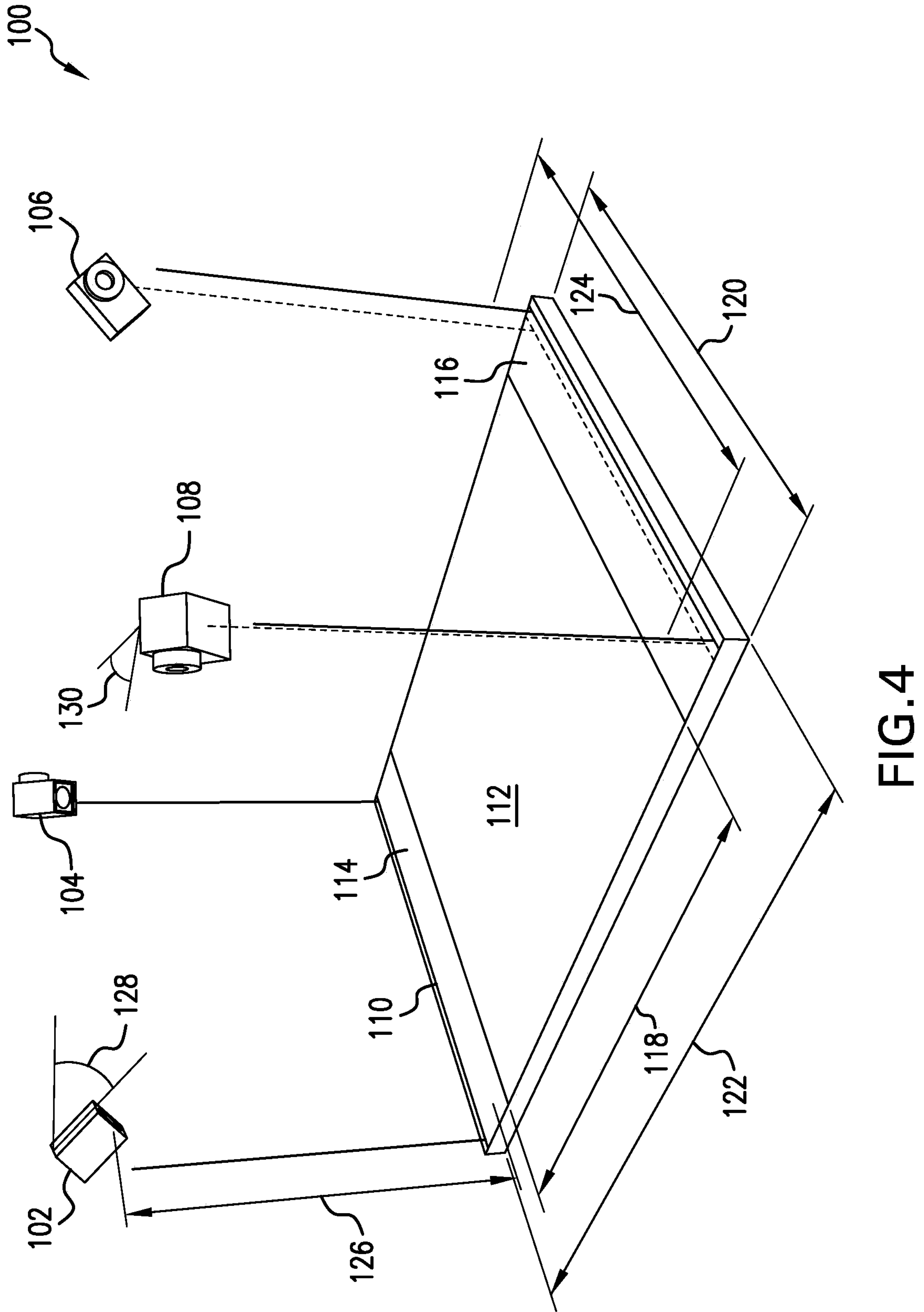
FIG. 4 depicts an illustration of an example system of item identification.

FIG. 4 shows a block diagram of an example assisted checkout system 200 within a single store 202. The store 202 can have multiple assisted checkout stations 204, 206 each equipped with an assisted checkout device, such as the assisted checkout device 100 of FIG. 5. The example illustrated in FIG. 5 has two checkout stations 204, 206, but other examples can have more or fewer assisted checkout stations. Each assisted checkout station can include a number of cameras and an associated extreme edge computing device. In the illustrated example, a first extreme edge computing device 218 at the first assisted checkout station 204 is coupled to receive video streams from five cameras 208, 210, 212, 214, 216, and a second extreme edge computing device 238 at the second assisted checkout station 206 is coupled to receive video streams from five other cameras 228, 230, 232, 234, 236. For example, cameras 210, 212, 214, and 216 in FIG. 5 can correspond to cameras 102, 104, 106, and 108 in a first instance of the assisted checkout device 100 of FIG. 4, and camera 208 in FIG. 5 can correspond to a fifth (e.g., overhead) camera, not shown in FIG. 4, for the first assisted checkout station 204. Similarly, cameras 230, 232, 234, and 236 in FIG. 4 can correspond to cameras 102, 104, 106, and 108 in a second instance of the assisted checkout device 100 of FIG. 5, and camera 228 in FIG. 4 can correspond to a fifth (e.g., overhead) camera, not shown in FIG. 5, for the second assisted checkout station 206.

The cameras 208, 210, 212, 214, 216, 228, 230, 232, 234, and 236 can be coupled to their respective extreme edge computing devices 218, 238 using any suitable wired or wireless link or protocol. Providing the camera links as direct wired links, e.g., over USB, as opposed to indirect wired links or wireless links, e.g., over internet protocol (IP), has dependability and robustness advantages, in that each assisted checkout system need not be reliant on local area network (e.g., Wi-Fi) internet connectivity within the store 202, which may be slow, congested, or intermittent.

The extreme edge computing devices 218, 238 can each be any computing system capable of receiving and processing video streams from their respective cameras. In some examples, each extreme edge computing device 218, 238 is equipped with an AI acceleration unit, e.g., a graphics processing unit (GPU) or tensor processing unit (TPU), to provide the computing capability that may be required to process the video streams in accordance with computer vision methods described in greater detail below. In some embodiments, the extreme edge computing devices 218, 238 can include a complete computer system with an AI acceleration unit and a heat sink in a self-contained package. Provided with video streams from their respective video cameras, each extreme edge computing device 218, 238 derives and outputs metadata indicative of items detected on a checkout plane of a respective checkout station 204 or 206. In some examples, not shown in FIG. 5, a single extreme edge computing device can be coupled to the cameras from multiple (e.g., two) assisted checkout stations and can perform video stream receipt and processing functions for all of the multiple assisted checkout stations for which it is connected to cameras. The handling of multiple assisted checkout stations by a single extreme edge computing device reduces system costs and increases operational efficiency.

Each extreme edge computing device 218, 238 can, in turn, be wired or wirelessly coupled to another computing device 240 located on-site within the store 202, referred to herein as an edge computing device, e.g., over various network connections such as an Ethernet or Wi-Fi local area network (LAN) using an internet protocol. In some examples (not shown), the store 202 is provided with multiple edge computing devices 240. Each edge computing device 240 is likewise equipped with an AI acceleration unit (e.g., GPU or TPU) to provide the computing capability that may be required to train or re-train machine learning (ML) models as described in greater detail below. A POS terminal 246, or multiple such terminals, can be coupled to the edge computing device 240 (as shown) and/or to individual ones of the extreme edge computing devices 218, 238 (not shown). Each edge computing device 240 can communicate (e.g., over the internet) with remotely hosted computing systems 248 configured for distributed computation and data storage functions, referred to herein as the cloud.

The edge computing device 240 can configure and monitor the extreme edge computing devices 218, 238 to which it is connected to enable and maintain assisted checkout functionality at each assisted checkout station 204, 206. For example, the edge computing device 240 can treat the extreme edge computing devices 218, 238 as a distributed computing cluster managed, for example, using Kubernetes. An edge computing device in a store can thus provide a single point of contact for monitoring all of the extreme edge computing devices in the store, through which all of the edge computing devices can be managed, e.g., remotely managed over the cloud via a web-based configuration application. Advantageously, each store can be provided with at least two extreme edge computing devices 218, 238 to ensure checkout reliability through system redundancy. The edge computing device 240 can also receive data and metadata from the extreme edge computing devices 218, 238, enabling it to train or retrain ML models and thus improve assisted checkout functionality over time. In some examples, the edge computing device 240 and the extreme edge computing devices 218, 238 can be accessed and configured via a user interface (UI) 242, e.g., a graphical user interface (GUI), that can be accessible via a web browser.

Figure 5:
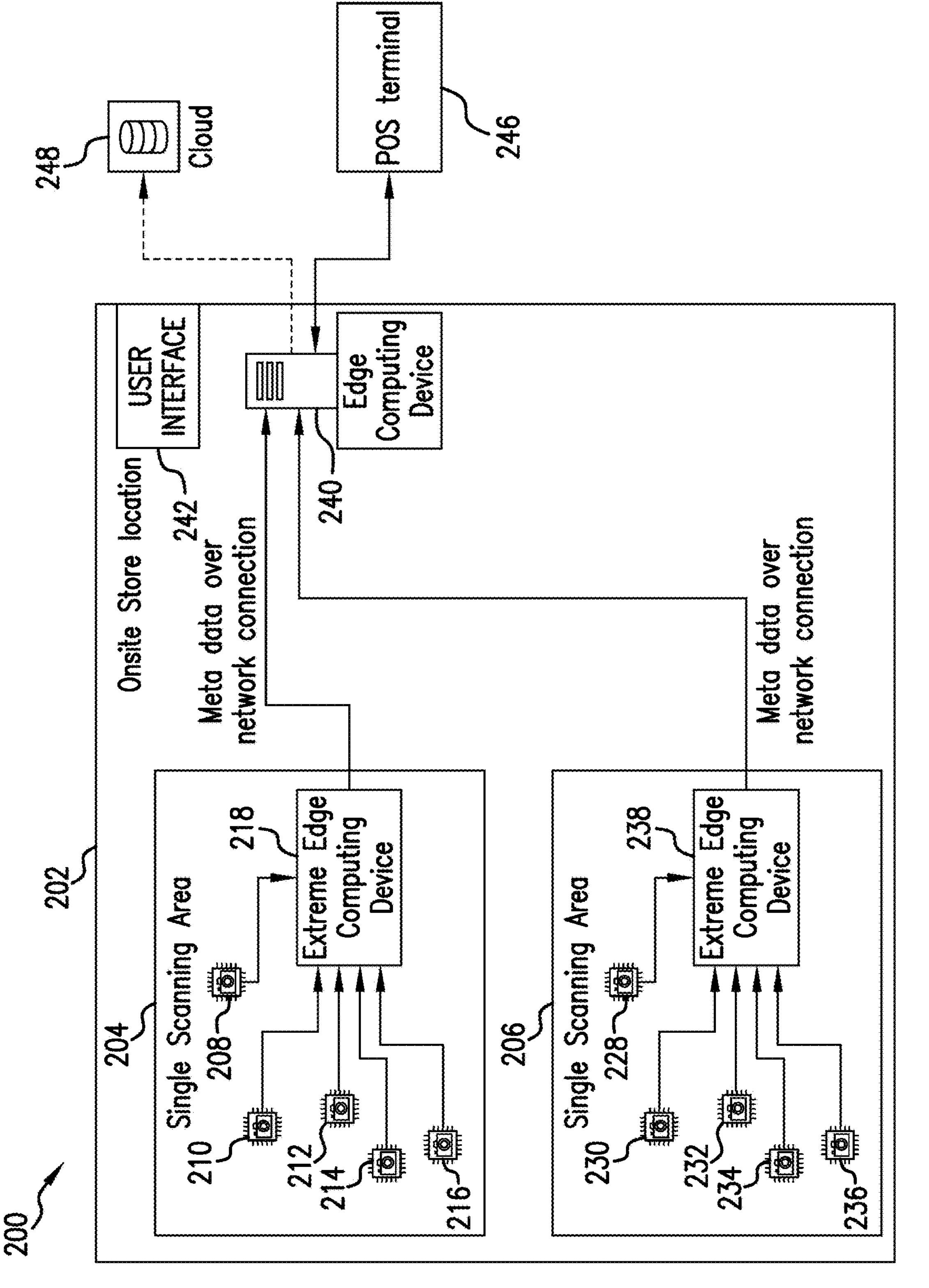
FIG. 5 depicts an illustration of an example system of item identification.

In some examples, not shown in FIG. 5, one or more cameras associated with an assisted checkout station 204, 206 can connect directly to the edge computing device 240, rather than to the corresponding extreme edge computing device 218, 238. For example, an assisted checkout device at an assisted checkout station may have four USB cameras coupled to its associated extreme edge computing device, and a fifth (e.g., overhead) camera that is an IP camera that streams via wired or wireless connection to the store's edge computer device. In some examples, metadata derived from the video stream data from the fifth (IP) camera, generated at the edge computing device, can be merged at the edge computing device with metadata derived from the video stream data from the four USB cameras, generated at the extreme edge computing device associated with the checkout station, to provide an enhanced interpretation of the scene observed by all five cameras associated with the checkout station. The combination of AI-acceleration-unit-enabled extreme edge computing devices and an AI-acceleration-unit-enabled edge computing device can thus result in more efficient distribution of data processing tasks while simplifying infrastructure setup and maintenance and reducing network bandwidth that would otherwise be associated with streaming all assisted checkout camera outputs directly to an edge computing device over a local area network. Although described by way of example as connecting to another fifth (e.g., overhead) camera, it should be appreciated that many cameras may connect directly to the edge computing device 240 (e.g., some or all of the cameras in an existing security camera infrastructure) in some embodiments.

In some examples, the edge computing device 240 can be used to collect visual analytics information provided by a visual analytics system running on the edge computing device 240. The visual analytics information can include information about individual customer journeys through the store: paths taken through the store, items observed or interacted with (e.g., picked up), areas of interest entered (e.g., a coffee station, a beverage cooler, a checkout queue, a checkout station), and other gestures, behaviors, and activities observed. Advantageously, such information can be garnered from existing security camera infrastructure without using facial recognition or obtaining personally identifying information (PII) about the customers observed in the store. The edge computing device 240 can collate this video analytics information and combine it with information from the assisted checkout extreme edge computing devices 218, 238, such as checkout list predictions, to produce more accurate checkout list predictions on the edge computing device 240. In some examples, the video analytics information can be used for checkout, e.g., to produce a checkout list, without the use of an assisted checkout device 100.

In some examples, inferencing using ML models, including those for detecting items and predicting what items appear in a scene, can be run on the extreme edge computing devices 218, 238, such that ML computational tasks are only offloaded to the edge computing device 240 for incremental training of ML models in real time. In the most frequent examples of operation of assisted checkout, each extreme edge computing device 218, 238 may send only generated metadata, rather than video streams or image data, to the edge computing device 242. The edge computing device 242 can be configured to maintain databases of items and sales, can communicate with the POS terminal 246, and can store feedback from the POS terminal 246. In some examples, each extreme edge computing device 218, 238 can operate generally to stream generated metadata unidirectionally to the edge computing device 240, by deriving still images from video streams and processing the still images to determine predictions regarding items in an observed scene over the checkout plane. ML learning, collection of feedback from cashiers, communicating with the POS, and storing of metadata can all take place on the edge computing device 242. As described in greater detail below with regard to FIGS. 4 and 5, feedback from the cashiers collected by the edge computing device 242 can, in some examples, be used to train ML models either on the edge computing device 242 or on the cloud. Newly trained or re-trained ML models can be provided from the edge computing device 242 back to the extreme edge computing devices 218, 238.

Examples of Assisted Checkout Flow

Figure 6:
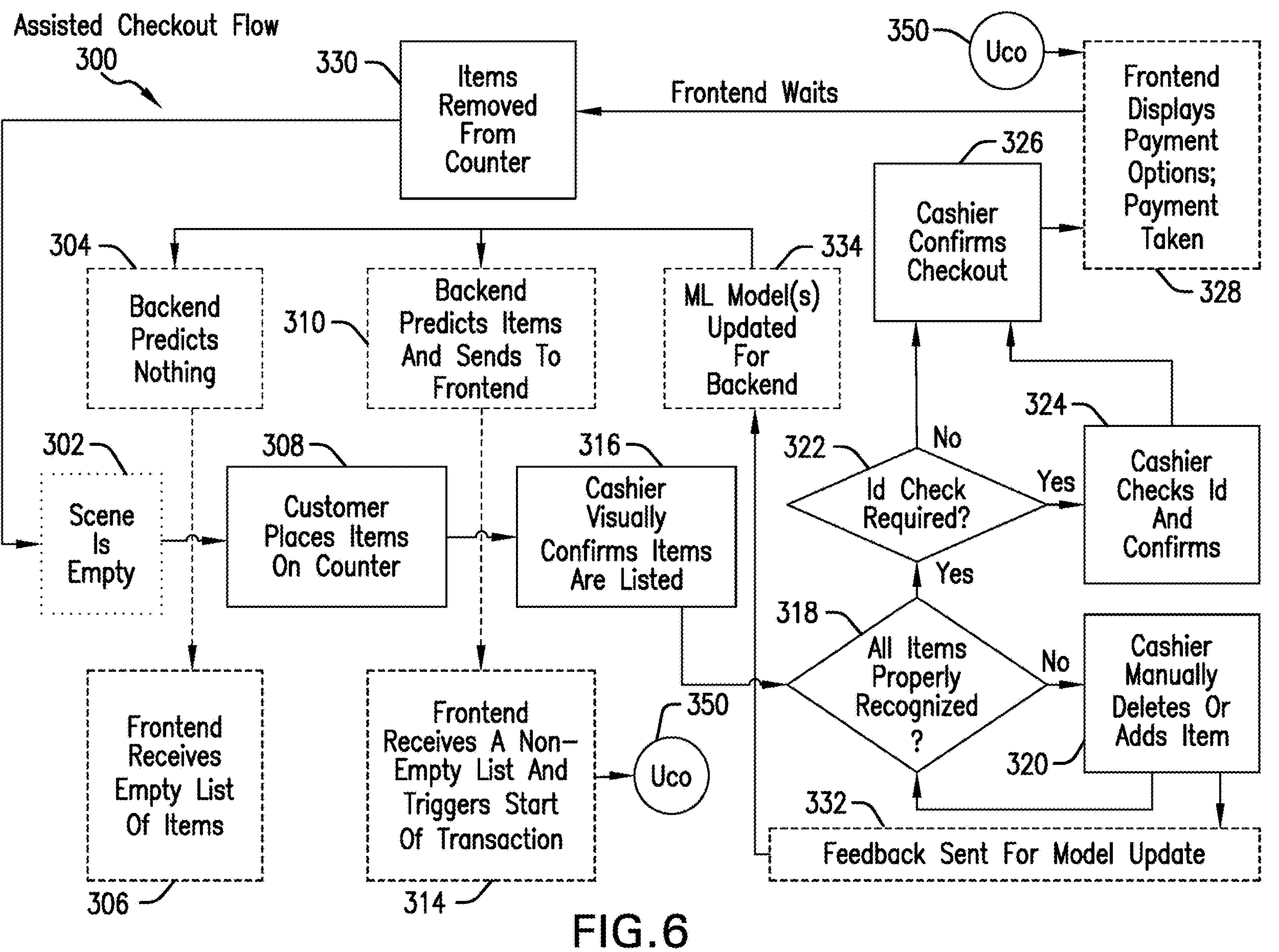
FIG. 6 depicts an illustration of a flow diagram of an example method for item identification.

FIG. 6 illustrates example functioning 300 of an assisted checkout device or system such as are respectively illustrated in FIGS. 4 and 5. The spatial volume over an assisted checkout plane (e.g., plane 112 in FIG. 4) of an assisted checkout station (e.g., station 204 or 206 in FIG. 5), as observed by associated cameras of a respective assisted checkout device (e.g., the device 100 of FIG. 4) is referred to herein as a scene. Initially, with no items placed on the assisted checkout plane, the scene is empty 302. The backend of the assisted checkout device therefore makes no predictions 304 as to the contents of the checkout list, and the frontend, as embodied, e.g., as one or more visual displays of the assisted checkout device, receives an empty list of items 306.

Subsequently, when a customer places items on the checkout counter 308, that is, on the checkout plane within view of the cameras of the assisted checkout device, the backend predicts the items placed on the checkout plane, generates a checkout list of the predicted items, and sends the generated checkout list to the frontend 310. The backend can also generate a quantification of confidence that the predicted checkout list is accurate and complete. For example, based on one or more items placed for checkout being recognized as observable by the assisted checkout device, but unidentifiable as particular items within the database of known items available for sale, the assisted checkout device can generate a low confidence indicator, which, in turn, can be used to generate an alert to the cashier. The alert can be displayed on the frontend, and/or can be indicated by lights on the assisted checkout device 100, e.g., built into the base or other portions of the assisted checkout device 100. For example, such lights could flash, or change color (e.g., from green to red), thereby alerting the cashier to an item recognition fault requiring manual intervention by the cashier.

Based on at least one presented item being successfully recognized as within the database, the frontend receives a non-empty list and triggers the start of a checkout transaction 314. At this point, any of several things can happen to complete the transaction. In some instances, a customer may begin the checkout process when the checkout station is initially unattended by a cashier. The assisted checkout device 100 may be enabled under certain conditions to complete the checkout process unattended. For example, based on (a) the backend of the assisted checkout device 100 reporting a confidence in the accuracy of the generated checkout list that exceeds a threshold, (b) the checkout list not including any items that require age verification (e.g., alcohol, nicotine, or lottery items), and (c) the customer indicating that payment is to be made without cash (e.g., by credit or debit card, or by using an electronic payment completed using a cellphone, or with a rewards card or certain coupons, or in accordance with a promotion) or cash handling equipment, the assisted checkout device 100 can proceed with unattended checkout (UCO) 350, if enabled to do so. With unattended checkout, the frontend of the assisted checkout device 100 displays payment options and takes payment 328. Although not shown in FIG. 6, payment information can be transmitted to a local database store. Having completed the checkout process, including the purchase transaction, the customer may then remove purchased items from the checkout counter 330 and leave the store.

Based on any of (a) the assisted checkout not being enabled for unassisted checkout, (b) the backing reporting a confidence in the accuracy of the checkout list that does not meet the threshold, (c) the checkout list containing items requiring age verification, (d) the customer not providing a cashless payment or otherwise indicating (e.g., through a GUI on the customer-facing visual display) that payment is to be made by cash or another method requiring cashier attendance, (d) a visual analytics system determining that the customer has one or more items not placed in the scene (e.g., a hot coffee or prepared food item, or an item that has been pocketed or otherwise concealed by the customer) or (e) the customer otherwise waiting for a cashier or indicating a need for help by the cashier, the checkout process may be continued as an attended checkout. If a cashier is not present at the assisted checked station, the cashier may be automatically alerted to attend the assisted checkout station. The cashier may then visually confirm that the generated checkout list (e.g., as displayed on a cashier-facing visual display) is accurate, e.g., that the checkout list contains no falsely recognized items and does not lack any unrecognized items or items that were not placed on the checkout plane.

In some examples, this confirmation by the cashier can be performed by the cashier looking at the list and looking at items placed on the checkout counter and/or withheld from the checkout counter by the customer, and comparing the list with the items presented for checkout on the checkout plane and/or withheld by the customer. In some examples, the assisted checkout device can provide, e.g., on a cashier-facing visual display monitor, a visual cue indicating which items placed on the checkout plane are unrecognized and thus are not entered on the checkout list. The visual cue can be, for example, a highlighting of the item in a video presentation derived from one or more of the cameras of the assisted checkout device. The highlighting can take the form of an adjusted brightness or contrast of the item in the video presentation, an outline or bounding box surrounding the item in the video presentation, or other form. The displayed visual cue can save the cashier time in determining which item or items on the checkout plane are unrecognized and require manual intervention to add to a checkout list. Any items not placed on the checkout plane (e.g., a cup of hot coffee preferred to be held by the customer and not placed on the checkout plane) can be scanned or otherwise entered for purchase either through the frontend or through a separate checkout system. Based on the cashier determining that all items in the scene have not been properly recognized and/or not all items presented for checkout have been listed on the checkout list 318, the cashier accordingly manually deletes or adds items to the list 320, e.g., using the GUI on the cashier-facing visual display.

In some examples, the manual deletion of falsely recognized items or the manual addition of unrecognized items can be performed by pressing quantity minus or quantity plus buttons on the GUI of the cashier-facing visual display. For example, if the checkout list erroneously includes an item confirmed by the cashier not to have been placed on the checkout plane, the cashier can locate the corresponding item on the list and press an associated quantity minus sign (−) button on the GUI to remove the item from the checkout list (or to decrement the number of identical items included on the checkout list). As another example, if the list erroneously includes too few of several identical items presented for checkout, the cashier can locate the corresponding item on the displayed checkout list and press an associated quantity plus sign (+) button to increment the number of identical items included on the checkout list.

In some examples, the cashier may manually intervene in the presentation of the items to the assisted checkout device, and may rearrange the items on the checkout plane to obtain a notably more accurate checkout list. For example, the cashier may spatially separate the items with respect to each other on the checkout plane, or may change the orientation of one or more items to give the cameras a better view of the items present for checkout.

In some examples, the cashier can manually scan one or more items presented for checkout to ensure their appearance on the checkout list. For example, the cashier can scan the one or more unidentified items using a UPC barcode reader or a QR code reader. Or, for example, a cashier may manually enter an identifying number for the item into the frontend or other system coupled to the assisted checkout device. In some examples, the cashier may hold the UPC barcode or QR code of an item, or other identifying marking of the item, up close to one of the cameras of the assisted checkout device, such that the item takes up a more substantial fraction of the field of view of the camera, prompting the assisted checkout device to perform an identification that is based on the UPC barcode or other identifying marking. Such identifying functionality may, for example, employ optical character recognition (OCR) to read a label of an item.

When a cashier manually enters an unrecognized item or otherwise manually adjusts a checkout list, manually entered information identifying the unrecognized item, images of the scene captured by the cameras during the checkout process, and/or metadata derived from the images can be automatically submitted 332 as system feedback data. The automatically submitted system feedback data can be used to retrain one or more ML models used by the backend to recognize items. The assisted checkout device, system of assisted checkout devices, and/or network of systems of assisted checkout devices at multiple stores can thereby learn information about the previously unrecognized item(s) and improve recognition of the items in future checkout transactions. Images or other data documenting manual overrides, such as the manually entered information identifying the unrecognized item, can be used for shrinkage reduction, e.g., theft, by a store employee or customer.

In some examples, an item may be placed on the checkout plane that is not a listed item for purchase, such as the customer's own wallet, keys, purse, or hand. Although the presence of such an item may reduce the checkout list accuracy confidence of the assisted checkout device 100 to a subthreshold value, and, in some circumstances may trigger an alert to the cashier, the cashier may exercise human discernment to safely ignore the non-inventory item presented, and confirm checkout 326.

Based on the cashier determining that all items presented for checkout have been properly recognized or manually entered 318 and are thus listed on the checkout list provided by the frontend, the cashier can then determine, e.g., based on an alert displayed on the cashier-facing visual display, whether an ID check is required 322 for any of the items presented for checkout. Based on no ID check being required for any of the items presented for checkout, the cashier can confirm the checkout 326, e.g., by pressing a "confirm" button or similar on the GUI of the cashier-facing visual display. In some examples, the assisted checkout system can interface with an automated age verification system to verify a person's age without human involvement, instead of having the cashier perform age verification. Based on an ID check being required for any of the items presented for checkout, the cashier can then ask the customer to present a valid identification document and confirm ID 324, e.g., by pressing an "ID confirmed" button or similar on the GUI of the cashier-facing display. The cashier can then proceed to confirm the checkout 326. The checkout having been confirmed, the frontend (e.g., a GUI of the customer-facing visual display) can display options for payment and, in some examples, can take payment 328. In examples in which a customer pays with cash, the cashier can take cash, make change, and use the frontend (e.g., a GUI of the cashier-facing visual display) to confirm payment. The attended checkout process is then complete, and the customer can remove the items from the checkout plane 330. The scene is then empty 302 again and the assisted checkout device thus can understand that when the scene next becomes non-empty 308, a new transaction has begun.

Figure 7:
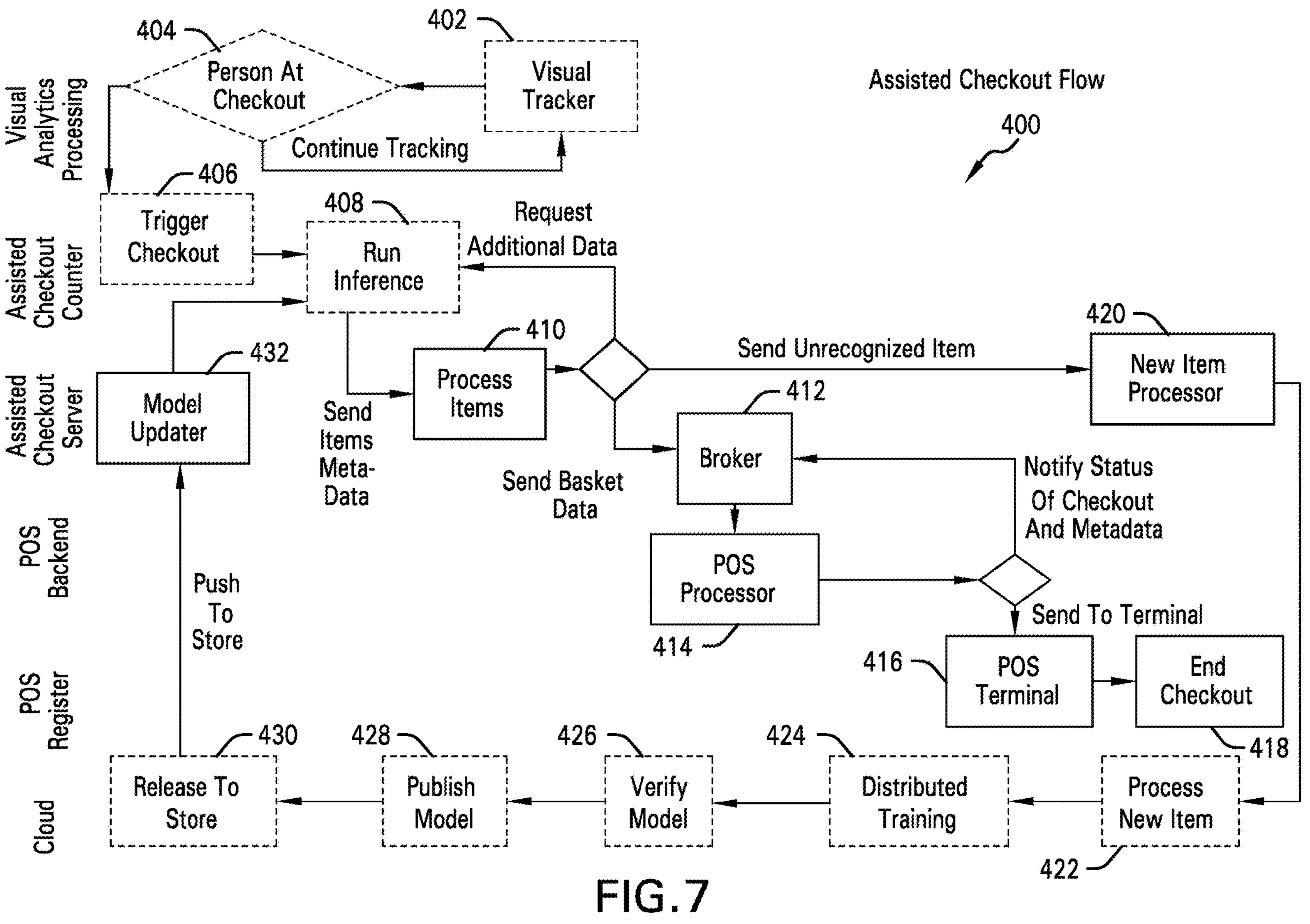
FIG. 7 depicts an illustration of a flow diagram of an example method for item identification.

FIG. 7 illustrates a flow chart of example processes 400 of the assisted checkout flow, as described above with regard to FIG. 6, organized with regard to the systems used to handle the various aspects of the checkout flow. In some examples, a machine-vision-based storewide visual analytics system can operate using information from security cameras located around the store (that is, not one of the several cameras included as a part of the assisted checkout device) to track customers within the store and provide predictions as to the items picked up by a customer during the customer's journey throughout the store, which are expected to be presented for checkout. The visual analytics system can track the customer 402 and thus determine when the customer has entered certain areas of interest (AOIs) within the store, e.g., by mapping the three-dimensional location of the tracked customer to designated areas of the floor plan of the store. Such AOIs can include, as examples, a checkout queue or a checkout area. Information from the visual analytics system can be provided to the assisted checkout system (e.g., assisted checkout system 200 in FIG. 5). For example, the visual analytics system can be coupled to an edge computing device of the assisted checkout system (e.g., edge computing device 240 in FIG. 5). In some examples, the visual analytics system can share the same edge computing device as the assisted checkout system. Accordingly, the visual analytics system can inform the assisted checkout system when a person is detected to be at a checkout station 404. This information can trigger the start of a checkout transaction 406 without the use of an assisted checkout device, or can be used in conjunction with information derived from an assisted checkout device, detecting that items have been placed on a checkout plane of the assisted checkout device, to trigger the start of a checkout transaction 406. By combining information derived from the assisted checkout device and the visual analytics system, checkout triggering 406 can be made more accurate, false triggers of checkout processes can be reduced or avoided, and timing anticipation of checkouts can be made. For example, if a visual analytics system predicts, based on customer journey data, that a customer is likely proceeding to an unattended checkout station for checkout, an alert can be issued to a cashier advising attendance of the checkout station, even before the customer physically arrives at the checkout station.

The checkout process having been triggered 406, inferences are then run 408 using ML models on the backend of the assisted checkout device to attempt to recognize items placed on the checkout plane of an assisted checkout device. The inferences can be run 408, for example, on an extreme edge device of the assisted checkout device (e.g., extreme edge device 218 or 238 of FIG. 5). The inferences can, for example, use still image frames derived from video streams from cameras of the assisted checkout device to generate metadata indicative of recognized items placed on the checkout plane. As indicated in FIG. 7, the checkout trigger 406 and the inference running 408 can take place at the assisted checkout counter, that is, based on information determined at an extreme edge computing device coupled to the assisted checkout device.

In the example of FIG. 7, the metadata produced by the backend of the assisted checkout device can be provided to an assisted checkout server, e.g., edge computing device 240 in FIG. 5. The assisted checkout server can process the metadata 410 to recognize the items and can determine if additional data is needed, for example, if a cashier may be required to manually scan one or more unrecognized items. The inferences may be re-run 408 at the assisted checkout counter and the item metadata re-processed 410 at the assisted checkout server based on the provision of the requested additional data. The generated final list of checkout items and/or a checkout total ("basket data") can be sent to a broker 412 at a point-of-sale (POS) backend. A POS processor 414 can receive input from the output of the broker 412 to process a tendered payment via an accepted method (e.g., a credit or debit card payment, or an e-payment made using a smartphone) using a POS terminal 416 at a POS register. The status of the checkout and the metadata can be provided back to the broker 412 at the POS backend in a feedback loop to ensure full payment is made, in some examples using multiple payment methods. The POS terminal 416 at the POS register receives the checkout total and accepts the payment method(s). The payment having been approved, the checkout transaction completes 418.

As discussed above with regard to FIG. 6, the assisted checkout system is capable of learning based on feedback from manual cashier intervention in the checkout process. For example, at the assisted checkout server, metadata about an unrecognized item can be sent to a new item processor 420 in the assisted checkout server. The new item processor can associate the metadata generated by ML inferencing 408 at the assisted checkout counter with manually provided item identification information. The metadata and the manually provided item identification information can be transmitted (e.g., over the internet) to the cloud system.

At the cloud, systems can process the new item 422 and conduct training or retraining of ML models, based on the feedback provided from the assisted checkout counter, using distributed computing 424 in the cloud. A newly trained or re-trained ML model can be manually or automatically verified 426, e.g., using established test data, to ensure, for example, that the newly trained or re-trained ML model does not have an unacceptably high error rate in recognizing products previously recognized accurately and with super-threshold confidence by previous versions of the ML model. The newly trained or re-trained model can then be published 428, e.g., by copying a model file containing the ML model to a location used for distribution. The newly trained or re-trained ML model is then released to the store (in some examples, to multiple stores) 430 using a push process, either immediately upon publication of the ML model or in accordance with an ML model push schedule. The assisted checkout server (the edge computing device) receives the pushed ML model from the cloud and updates the older version of the model stored at the assisted checkout counter (the extreme edge computing device) using a model updater 432 on the assisted checkout server. The model updater 432 on the assisted checkout server can, for example, perform checks to ensure that only newer versions of models replace older versions of models at the assisted checkout counter, and not vice-versa. The model updater 432 can also queue model updating to ensure that temporarily offline assisted checkout counter devices (extreme edge computing devices) eventually have their ML models updated upon coming back online. The feedback loop of boxes 408, 420, 422, 424, 426, 428, 430, and 432 permits the system to learn and improve. There may also be multiple appearances of a SKU (or UPC code), e.g., with new or holiday packaging of an item already existing in the item database. These items with different appearances may coexist at the store for a period of time. At some point, one of the item appearances may cease to exist. The system can handle multiple appearances and also can re-train the model and remove the old appearance with or without confirmation by a human operator. Although the ML models are described herein as being "pushed" to the various stores in the illustrative embodiment, it should be appreciated that the edge computing device may, additionally or alternatively, "pull" the current/updated ML models periodically according to a predefined schedule and/or occurrence of some condition in other embodiments.

The desirability and advantages of such a learning and improvement feedback loop used as online training, as described above with regard to FIGS. 4 and 5, is underscored considering the frequency of the introduction of new items, or the revision of item packaging, that could confuse the ML models upon which inferencing is run 408 at the assisted checkout counter, along with the onerousness and potential incompleteness associated with offline training. In offline training, ML models used by assisted checkout devices to visually recognize items are trained on new items or new item packaging outside of the sale process, e.g., using dedicated training time, staff, facilities, equipment, and item inventory. Apart from the undesirable added cost associated with offline training, relying on offline training may be slow to account for introductions for sale at stores of new items or new item packaging, resulting in a lag time between such an introduction and when the associated items can be successfully recognized by unassisted checkout devices. Moreover, offline training may fail to account for regional variations in items or item packaging, such that some stores never receive a model tailored for their particular item or item packaging variations.

Online training can be conducted at the assisted checkout server, or using the cloud, or both. Online training that employs the cloud can use training inputs derived from assisted checkout devices at multiple stores, e.g., many stores located across a geographic region (e.g., across a state, a country or across the world). Online training can therefore capable of obtaining a sufficient volume of training data in a shorter period of time than could be accomplished with offline training, at reduced training expense, because training resources (e.g., training staff and training data acquisition time) are not needed to accumulate the sufficient volume of training data necessary to newly train or re-train ML model. Such training data is passively acquired by the cloud in the course of normal sale use of assisted checkout systems in stores. Online training can further eliminate the administrative expense associated with specifically keeping track of, and notifying an ML model training staff of, new items and item packaging introduced in stores.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirt and scope of the present disclosure. Thus the present disclosure should not be limited by any of the above-described exemplary embodiments, but should be defined only in accordance with the following claims and their equivalents.

What is claimed is:

1. A system for automatically identifying a plurality of items positioned at a point of sale (POS) system based on a plurality of item parameters associated with each item as provided by a plurality of images captured by a plurality of cameras positioned at the POS system, comprising:

at least one processor;

a memory coupled with the at least one processor, the memory including instructions that, when executed by the at least one processor cause the at least one processor to:

extract the plurality of item parameters associated with each item positioned at the POS system from the plurality of images of each item captured by the plurality of cameras positioned at the POS system to map the plurality of item parameters into a corresponding feature vector for each item, wherein the item parameters associated with each item when combined and mapped into the corresponding feature vector for each item are indicative as to an identification of each corresponding item thereby enabling the identification of each corresponding item, identify each corresponding item positioned at the POS system when each feature vector associated with each item matches a corresponding stored feature vector as stored in an item parameter identification database and fail to identify each corresponding item when each feature vector associated with each item fails to match a corresponding stored feature vector, and stream each feature vector associated with each item positioned at the POS system that fails to match a corresponding stored feature vector stored in the item parameter identification database thereby enabling the identification of each failed item when each feature vector of each failed item are subsequently identified when positioned at the POS system after the failed match.

2. The system of claim 1, wherein the processor is further configured to:

automatically extract each feature vector associated with each item positioned at the POS system from the images captured of each item that failed to be identified at the POS system, wherein each feature vector includes POS data that depicts the item parameters captured at the POS system and identified as failing to match a corresponding combination of item parameters mapped to a corresponding stored feature vector stored in the item parameter identification database; and automatically stream the POS data of each feature vector and each corresponding image captured of each item positioned at the POS system that failed to match a corresponding stored feature vector stored in the item parameter identification database to an item identification server.

3. The system of claim 2, wherein the processor is further configured to:

automatically receive an updated feature vector that includes updated streamed POS data associated with each image captured of each item that failed to be identified as trained on a neural network based on machine learning as the neural network continuously updates the updated feature vector with updated POS data based on past feature vectors that include past POS data as captured from past images captured of each item previously positioned at the POS system that failed to be identified as streamed from the item identification server;

analyze each updated feature vector as provided by the neural network to determine a plurality of updated item parameters associated with each item currently positioned at the POS system that failed to be identified when previously positioned at the POS system, wherein each updated feature vector associated with each item are indicative to an identity of each item currently positioned at the POS system when previously positioned at the POS system failed to match a corresponding stored feature vector as stored in the item parameter identification database; and automatically identify each corresponding item currently positioned at the POS system when the updated feature vector associated with each item as provided by the neural network matches the corresponding stored feature vector associated with each item in the item parameter identification database.

4. The system of claim 1, wherein the processor is further configured to:

crop each item positioned at the POS system from the plurality of images of each item captured by the plurality of cameras positioned at the POS system to segment each item positioned at the POS system into a single cropped image and excludes each other item positioned at the POS system from the single cropped image, wherein each image positioned at the POS system is depicted in a corresponding single cropped image that excludes each other item positioned at the POS system from the corresponding single cropped image.

5. The system of claim 4, wherein the processor is further configured to:

extract the plurality of item parameters associated with each item positioned at the POS system from each corresponding single cropped image depicting each corresponding item to map the plurality of item parameters into the corresponding feature vector for each item generated from each corresponding single cropped image;

analyze each feature vector generated from each corresponding cropped image to determine when the feature vector matches the corresponding stored feature vector stored in the item parameter identification database; and identify each corresponding item positioned at the POS system when each feature vector generated from each corresponding cropped image matches the corresponding stored feature vector as stored in the item parameter identification database.

6. The system of claim 5, wherein the processor is further configured to:

stream each single cropped image depicting each corresponding item and each corresponding feature vector generated from the corresponding single cropped image for each item positioned at the POS system that fails to match a corresponding stored feature vector stored in the item parameter identification database to the item parameter identification database; and accumulate a plurality of single cropped images captured of each corresponding item and a plurality of stored feature vectors generated from each corresponding single cropped image captured of each corresponding item into the item parameter identification database thereby enabling the plurality of single cropped images and corresponding stored feature vectors to be associated with each corresponding item as stored in the item parameter identification database, wherein the each single cropped image and each corresponding stored feature vector as associated with each corresponding item as stored in the item parameter identification database provides an increase in the item parameters associated with the corresponding item as stored in the item parameter identification database.

7. The system of claim 6, wherein the processor is further configured to:

analyze the accumulation of the single cropped images and corresponding stored feature vectors as associated with each corresponding item in the item parameter identification database to determine whether a feature vector associated with an item as captured in a single cropped image as positioned at the POS system matches the accumulation of the single cropped images and corresponding stored feature vectors as associated with each corresponding item in the item parameter identification database; and identify the item as captured in the single cropped image as positioned at the POS system when the feature vector associated with the item matches the accumulation of single cropped images and corresponding stored feature vectors for a corresponding item as stored in the item parameter identification database, wherein the accumulation of single cropped images and corresponding stored feature vectors as associated with the item positioned at the POS system provides the increase in the item parameters associated with the item as stored in the item parameter identification database.

8. The system of claim 7, wherein the processor is further configured to:

cluster the accumulation of the single cropped images and corresponding stored feature vectors that include an overlapping item parameter that overlaps into each of the stored feature vectors, wherein the overlapping item parameter is associated with an item that is captured in each of the accumulation of the single cropped images thereby triggering the overlapping item parameter to be included in each of the stored feature vectors generated from the accumulation of the single cropped images.

9. The system of claim 8, wherein the processor is further configured to:

determine a cosine distance for each stored feature vector as clustered from the accumulation of single cropped images that include the overlapping item parameter, wherein the cosine distance for each stored feature vector as clustered from the accumulation of single cropped images provides an indication as whether each stored feature vector as clustered is associated with an identified item;

map each stored feature vector as clustered from accumulation of single cropped images to the identified item when the cosine distance for each stored feature vector as clustered within a cosine distance threshold thereby indicating that each stored feature vector as clustered within the cosine distance is associated with the identified item; and automatically annotate each single cropped image from the accumulation of single cropped images as capturing the identified item when each corresponding stored feature vector as clustered is within the cosine distance threshold thereby indicating that each corresponding single cropped image as capturing the identified item.

10. The system of claim 9, wherein the processor is further configured to:

automatically annotate the cluster of the accumulation of the single cropped images and corresponding stored feature vectors that include the overlapping item parameter that overlaps into each of the stored feature vectors with a single label that identifies the cluster of accumulation of the single cropped images as capturing the identified item when the stored feature vectors as clustered are within the cosine distance.

11. The system of claim 1, wherein the processor is further configured to:

analyze each feature vector associated with each item positioned at the POS system to determine whether the item parameters when combined and mapped into each feature vector associated with each item matches a corresponding stored feature vector stored in the item parameter database, wherein the item parameter identification database stores different combinations of item parameters as mapped into different stored feature vectors with each different stored feature vector associated with a corresponding item thereby identifying each corresponding item based on each different combination of item parameters mapped to each corresponding stored feature vector associated with each corresponding item.

12. A method for automatically identifying a plurality of items positioned at a point of sale (POS) system based on a plurality of item parameters associated with each item as provided by a plurality of images captured by a plurality of cameras positioned at the POS system, comprising:

extracting the plurality of item parameters associated with each item positioned at the POS system from the plurality of images of each item captured by the plurality of cameras positioned at the POS system to map the plurality of item parameters into a corresponding feature vector for each item, wherein the item parameters associated with each item when combined and mapped into the corresponding feature vector for each item are indicative as to an identification of each corresponding item thereby enabling the identification of each corresponding item;

identifying each corresponding item positioned at the POS system when each feature vector associated with each item matches a corresponding stored feature vector as stored in an item parameter identification database and failing to identify each corresponding item when each feature vector associated with each item fails to match a corresponding stored feature vector; and streaming each feature vector associated with each item positioned on the POS system that fails to match a corresponding stored feature vector stored in the item parameter identification database thereby enabling the identification of each failed item when each feature vector of each failed item is subsequently identified when positioned at the POS system after the failed match.

13. The method of claim 12, further comprising:

automatically extracting each feature vector associated with each item positioned at the POS system from the images captured of each item that failed to be identified at the POS system, wherein each feature vector includes POS data that depicts the item parameters captured at the POS system and identified as failing to match a corresponding combination of item parameters mapped to a corresponding stored feature vector stored in the item parameter identification database; and automatically streaming the POS data of each feature vector and each corresponding image captured of each item positioned at the POS system that failed to match a corresponding stored feature vector stored in the item parameter identification database to an item identification server.

14. The method of claim 13, further comprising:

automatically receiving an updated feature vector that includes updated streamed POS data associated with each image captured of each item that failed to be identified as trained on a neural network based on machine learning as the neural network continuously updates the updated feature vector with updated POS data based on past feature vectors that include past POS data as captured from past images captured of each item previously positioned at the POS system that failed to be identified as streamed from the item identification server;

analyzing each updated feature vector as provided by the neural network to determine a plurality of updated item parameters associated with each item currently positioned at the POS system that failed to be identified when previously positioned at the POS system, wherein each updated feature vector associated with each item are indicative to an identity of each item currently positioned at the POS system when previously positioned at the POS system failed to match a corresponding stored feature vector as stored in the item parameter identification database; and automatically identifying each corresponding item currently positioned at the POS system when the updated feature vector associated with each item as provided by the neural network matches the corresponding stored feature vector associated with each item in the item parameter database.

15. The method of claim 12, further comprising:

cropping each item positioned at the POS system from the plurality of images of each item captured by the plurality of cameras positioned at the POS system to segment each item positioned at the POS system into a single cropped image and excludes each other item positioned at the POS system from the single cropped image, wherein each image positioned at the POS system is depicted in a corresponding single cropped image that excludes each other item positioned at the POS system from the corresponding single cropped image.

16. The method of claim 15, further comprising:

extracting the plurality of item parameters associated with each item positioned at the POS system from each corresponding single cropped image depicting each corresponding item to map the plurality of item parameters into the corresponding feature vector for each item generated from each corresponding single cropped image;

analyzing each feature vector generated from each corresponding cropped image to determine when the feature vector matches the corresponding stored feature vector stored in the item parameter identification database; and identifying each corresponding item positioned at the POS system when each feature vector generated from each corresponding cropped image matches the corresponding stored feature vector as stored in the item parameter identification database.

17. The method of claim 16, further comprising:

streaming each single cropped image depicting each corresponding item and each corresponding feature vector generated from the corresponding single cropped image for each item positioned at the POS system that fails to match a corresponding stored feature vector stored in the item parameter identification database to the item parameter identification database; and accumulating a plurality of single cropped images captured of each corresponding item and a plurality of stored feature vectors generated from each corresponding single cropped image captured of each corresponding item into the item parameter identification database thereby enabling the plurality of single cropped images and corresponding stored feature vectors to be associated with each single cropped image and each corresponding stored feature vector as associated with each corresponding item as stored in the item parameter identification database provides an increase in the item parameters associated with the corresponding item as stored in the item parameter identification database.

18. The method of claim 17, further comprising:

analyzing the accumulation of the single cropped images and corresponding stored feature vectors as associated with each corresponding item in the item parameter identification database to determine whether a feature vector associated with an item as captured in a single cropped image as positioned at the POS system matches the accumulation of the single cropped images and corresponding stored feature vectors as associated with each corresponding item in the item parameter identification database; and identifying the item as captured in the single cropped image as positioned at the POS system when the feature vector associated with the item matches the accumulation of single cropped images and corresponding stored feature vectors for a corresponding item as stored in the item parameter identification database, wherein the accumulation of single cropped images and corresponding stored feature vectors as associated with the item positioned at the POS system provides the increase in the item parameters associated with the item as stored in the item parameter identification database.

19. The method of claim 18, further comprising:

clustering the accumulation of the single cropped images and corresponding stored feature vectors that include an overlapping item parameter that overlaps into each of the stored feature vectors, wherein the overlapping item parameter is associated with an item that is captured in each of the accumulation of the single cropped images thereby triggering the overlapping item parameter to be included in each of the stored feature vectors generated from the accumulation of the single cropped images.

20. The method of claim 19, further comprising:

determining a cosine distance for each stored feature vector as clustered from the accumulation of single cropped images that include the overlapping item parameter, wherein the cosine distance for each stored feature vector as clustered from the accumulation of single cropped images provides an indication as whether each stored feature vector as clustered is associated with an identified item;

mapping each stored feature vector as clustered from the accumulation of single cropped images to the identified item when the cosine distance for each stored feature vector as clustered within the cosine distance is associated with the identified item; and automatically annotating each single cropped image from the accumulation of single cropped images as capturing the identified item when each corresponding stored feature vector as clustered is within the cosine distance threshold thereby indicating that each corresponding single cropped image as capturing the identified item.

21. The method of claim 20, further comprising:

automatically annotating the cluster of the accumulation of the single cropped images and corresponding stored feature vectors that include the overlapping item parameter that overlaps into each of the stored feature vectors with a single label that identifies the cluster of accumulation of the single cropped images as capturing the identified item when the stored feature vectors as clustered are within the cosine distance.

22. The method of claim 12, further comprising:

analyzing each feature vector associated with each item positioned at the POS system to determine whether the item parameters when combined and mapped into each feature vector associated with each item matches a corresponding stored feature vector in the item parameter identification database, wherein the item parameter identification database stores different combinations of item parameters as mapped into different stored feature vectors with each different stored feature vector associated with a corresponding item thereby identifying each corresponding item based on each different combination of item parameters mapped to each corresponding stored feature vector associated with each corresponding item.

* * * * *